US012065782B2

(12) United States Patent
Nelson

(10) Patent No.: US 12,065,782 B2
(45) Date of Patent: Aug. 20, 2024

(54) SYSTEMS AND METHODS FOR DEWATERING AND DRYING NANOCELLULOSE

(71) Applicant: GranBio Intellectual Property Holdings, LLC, Minnetrista, MN (US)

(72) Inventor: Kimberly Nelson, Atlanta, GA (US)

(73) Assignee: GranBio Intellectual Property Holdings, LLC, Thomaston, GA (US)

( * ) Notice: Subject to any disclaimer, the term of this patent is extended or adjusted under 35 U.S.C. 154(b) by 375 days.

(21) Appl. No.: 17/423,148

(22) PCT Filed: Mar. 22, 2020

(86) PCT No.: PCT/US2020/024093
§ 371 (c)(1),
(2) Date: Jul. 15, 2021

(87) PCT Pub. No.: WO2020/160565
PCT Pub. Date: Aug. 6, 2020

(65) Prior Publication Data
US 2022/0127788 A1    Apr. 28, 2022

Related U.S. Application Data

(60) Provisional application No. 62/795,277, filed on Jan. 22, 2019.

(51) Int. Cl.
*D21C 9/18*   (2006.01)
*B82Y 40/00*  (2011.01)

(52) U.S. Cl.
CPC .............. *D21C 9/18* (2013.01); *B82Y 40/00* (2013.01)

(58) Field of Classification Search
CPC . D21C 9/18; B82Y 40/00; C08H 8/00; C08H 6/00; C08L 23/14; C08L 67/04; C08L 97/02; D21H 11/18; F26B 5/005
See application file for complete search history.

(56) References Cited

U.S. PATENT DOCUMENTS

| 4,481,076 A | 11/1984 | Herrick |
| 6,228,213 B1 * | 5/2001 | Hanna ..................... C08H 8/00 162/22 |

(Continued)

FOREIGN PATENT DOCUMENTS

| CA | 3031013 A1 | 2/2018 |
| EP | 1493752 A1 | 1/2005 |

(Continued)

OTHER PUBLICATIONS

PCT/US2020/024093 International Search Report and Written Opinion dated Jul. 16, 2020.

(Continued)

*Primary Examiner* — Jacob T Minskey
*Assistant Examiner* — Matthew M Eslami
(74) *Attorney, Agent, or Firm* — O'Connor & Company; Ryan P. O'Connor

(57) ABSTRACT

The present invention allows the production of nanocellulose in dry form, enabling incorporation into a wide variety of end-use applications. Some variations provide a nanocellulose-slurry dewatering system comprising: a nanocellulose slurry feed sub-system; a pre-concentration unit (e.g., a centrifuge) to remove at least a portion of the water from the nanocellulose slurry; an inlet for a dispersion/drying agent; a twin-screw extruder in flow communication with the nanocellulose slurry feed sub-system, wherein the twin-screw extruder intimately mixes the nanocellulose slurry and the dispersion/drying agent, wherein the twin-screw extruder shears the nanocellulose slurry, and wherein the twin-screw extruder is configured with one or more extruder vents to remove water from the nanocellulose slurry; and an extruder outlet for recovering a nanocellulose-dispersion concentrate. A milling device may be employed to generate a fine powder of the nanocellulose-dispersion concentrate.

(Continued)

Methods of making and using the dewatered or dried nanocellulose are also described.

16 Claims, 14 Drawing Sheets

(56) References Cited

U.S. PATENT DOCUMENTS

| | | | |
|---|---|---|---|
| 11,041,051 B2 | 6/2021 | Youngblood et al. | |
| 2014/0227605 A1* | 8/2014 | Nakamura | B29C 48/0018 |
| | | | 264/171.1 |
| 2015/0337088 A1* | 11/2015 | Chevalier | C08L 27/18 |
| | | | 523/435 |

FOREIGN PATENT DOCUMENTS

| | | | | |
|---|---|---|---|---|
| WO | 2014096547 A1 | 6/2014 | | |
| WO | 2017037349 A1 | 3/2017 | | |
| WO | WO-2017037349 A1 * | 3/2017 | ............ | C08B 1/003 |
| WO | 2020086419 A1 | 4/2020 | | |
| WO | 2020086466 A1 | 4/2020 | | |

OTHER PUBLICATIONS

Huang et al., "A review of separation technologies in current and future biorefineries", Separation and Purification Technology, 62, 1-21, 2008.

* cited by examiner

A nanocellulose material is provided in the form of an aqueous nanocellulose slurry

A dispersion/drying agent is added to a nanocellulose slurry, wherein the dispersion/drying agent is compatible with the nanocellulose

The nanocellulose slurry may be pre-concentrated using a centrifuge or filtration device

A nanocellulose-dispersion concentrate is made by dewatering the nanocellulose slurry using a twin-screw system with water release

The nanocellulose-dispersion concentrate may be milled to produce a dry powder

The nanocellulose-dispersion concentrate may be employed in an end-use application, such as fabrication of a composite product

FIG. 2

SYSTEMS AND METHODS FOR DEWATERING AND DRYING NANOCELLULOSE

PRIORITY DATA

This international patent application claims priority to U.S. Provisional Patent Application No. 62/795,277, filed on Jan. 22, 2019, which is hereby incorporated by reference herein.

FIELD

The present invention generally relates to systems and methods for dewatering and drying nanocellulose for incorporation in polymers and other systems.

BACKGROUND

Nanocellulose has gained prominence as a nanostructured material. Nanocellulose features biodegradability and environmental sustainability since it is derived from a naturally occurring resource, cellulose—which is the most abundant polymer on earth. In addition, nanocellulose offers tremendous technical potential to improve the mechanical strength and other properties of composites, regardless of the social and environmental sustainability of nanocellulose. Nanocellulose is composed of parallel linear polysaccharide molecules. Nanocellulose has attractive physicochemical properties, such as extraordinarily high stiffness and strength, alongside its abundance and sustainability.

Nanocellulose is being developed for use in a wide variety of applications such as polymer reinforcement, anti-microbial films, biodegradable food packaging, printing papers, pigments and inks, paper and board packaging, barrier films, adhesives, biocomposites, wound healing, pharmaceuticals and drug delivery, textiles, water-soluble polymers, construction materials, recyclable interior and structural components for the transportation industry, rheology modifiers, low-calorie food additives, cosmetics thickeners, pharmaceutical tablet binders, bioactive paper, pickering stabilizers for emulsion and particle stabilized foams, paint formulations, films for optical switching, and detergents.

However, there remains a serious technical challenge associated with widespread use of nanocellulose. In particular, removing water from nanocellulose suspensions to maintain nanoscale dimensions is very difficult. In most cases, nanocellulose particles are processed as aqueous suspensions because of their hydrophilic nature and propensity to agglomerate during drying. There is an industrial need to develop robust dispersion and drying processes which will maintain nanoscale dimensions for materials applications where a dry form is necessary. Drier forms of nanocellulose also mitigate high transportation costs of dilute aqueous suspensions and expand the number of end-use applications that have limitations on the amount of water that can be added to the product.

In the case of both cellulose nanocrystals as well as cellulose nanofibrils (or microfibrils), the dispersibility of nanocellulose in non-aqueous-based polymers and other systems has remained problematic, as they typically require dried forms of nanocellulose for incorporation. Nanocellulose tends to irreversibly bond to itself during drying, resulting in large agglomerates of nanocellulose. The large agglomerates often impede or even destroy the intended property benefit for the polymer composite or other system into which the nanocellulose particles are being introduced. For example, well-dispersed nanocellulose particles in polymers can result in significant mechanical strength enhancement. When the nanocellulose becomes agglomerated, however, there may be no mechanical strength enhancement at all—or even worse, for example, large agglomerates can result in stress concentrators that can cause premature failure of a polymer part.

In terms of improving nanocellulose dispersion in non-aqueous-based products, various drying approaches have been tried. These approaches usually require extreme measures that would prove difficult to scale-up to commercial quantities, and are therefore uneconomical. Generally, these methods are based on lyophilization (freeze drying) of nanocellulose, which is the established, laboratory method for preventing irreversible inter-particle bonding of nanocellulose. Freeze-drying is not economical nor scalable for commercial production of nanocellulose.

For practically all non-aqueous applications in which nanocellulose is used, improving its dispersion and thus the utility and benefit to these applications has been a major hurdle for implementation of nanocellulose. Thus, it has become important to improve nanocellulose dispersion using economical methods that make the nanocellulose highly dispersible in polymers and other systems. Economical methods usually entail a dried composition containing nanocellulose. A dried form of nanocellulose is especially important in the field of thermoplastic processing such as extrusion and injection molding, in which thermal melting processes are encountered. During thermal melting processes with non-polar thermoplastics, water is a detriment to satisfactory processing.

Dewatering, or concentrating, nanocellulose slurries for more efficient shipping or use in water-limited applications is inherently difficult because of the high water-holding capacity and high viscosity of these materials at low concentrations. For aqueous-based applications, end users require nanocellulose "concentrates" with as high solids content as possible, while being rapidly redispersible with low-energy, standard mixing equipment. Depending on the application, nanocellulose may require redispersion in water such that the unique and purposely engineered nanoscale properties are retained.

In view of the aforementioned needs in the art, improved systems and methods for dewatering and drying nanocellulose are acutely needed, for polymer composites and other systems beyond polymers.

SUMMARY

Some variations of the invention provide a nanocellulose-slurry dewatering system comprising:
- a nanocellulose slurry feed sub-system, wherein the nanocellulose slurry comprises nanocellulose and water;
- an inlet for a dispersion/drying agent;
- a twin-screw extruder in flow communication with the nanocellulose slurry feed sub-system, wherein the twin-screw extruder is configured for intimately mixing the nanocellulose slurry and the dispersion/drying agent, and wherein the twin-screw extruder is configured with one or more extruder vents to remove at least a portion (such as all) of the water from the nanocellulose slurry;
- an extruder outlet for recovering a nanocellulose-dispersion concentrate comprising (i) the nanocellulose, (ii) the dispersion/drying agent, and (iii) residual water, if any; and an optional milling device configured to generate a powder containing the nanocellulose-dispersion concentrate.

In some embodiments, such as when processing dilute slurries, the nanocellulose slurry feed sub-system is configured with an internal rotating agitator and/or wiping blade to mix the nanocellulose slurry.

In some embodiments, the nanocellulose-slurry dewatering system comprises a nanocellulose slurry pre-concentration unit configured to remove at least a portion of the water from the nanocellulose slurry prior to water removal in the extruder. For example, the nanocellulose slurry pre-concentration unit may be a centrifuge or a filtration device.

In some embodiments, the nanocellulose-slurry dewatering system comprises a mixing unit configured for mixing the nanocellulose slurry with the dispersion/drying agent.

In some embodiments, the inlet for the dispersion/drying agent is an inlet to the nanocellulose slurry feed sub-system. In other embodiments, the inlet for the dispersion/drying agent is an inlet directly to the twin-screw extruder. There also may be inlets for the dispersion/drying agent both to the nanocellulose slurry feed sub-system as well as to the twin-screw extruder. The dispersion/drying agent may be combined with the nanocellulose slurry prior to adding to pre-concentration unit, or after the nanocellulose slurry has been pre-concentrated in a pre-concentration unit, if any. Preferably, the nanocellulose slurry and dispersion/drying agent are mixed together, such as with an agitated mix tank or in-line mixer, before adding the mixture to the nanocellulose slurry feed sub-system.

The twin-screw extruder may be a co-rotating twin-screw extruder, a counter-rotating twin-screw extruder, or another type of twin-screw extruder.

When the optional milling device is present, the milling device may be selected from a hammer mill, a ball mill, a jet mill, an impact crusher, a pulverizer, a cage mill, a grinder, or an extruder, for example.

Some variations do not necessarily employ a dispersion/drying agent. In some of these variations, a nanocellulose-slurry dewatering system comprises:
 a nanocellulose slurry feed sub-system, wherein the nanocellulose slurry comprises nanocellulose and water;
 a twin-screw extruder in flow communication with the nanocellulose slurry feed sub-system, wherein the twin-screw extruder is configured for shearing the nanocellulose slurry, and wherein the twin-screw extruder is configured with one or more extruder vents to remove at least a portion of the water from the nanocellulose slurry;
 an optional milling device configured to generate a powder containing the nanocellulose slurry; and
 an extruder outlet for recovering dewatered nanocellulose.

Some variations provide a nanocellulose-slurry dewatering system comprising:
 a nanocellulose slurry feed sub-system, wherein the nanocellulose slurry comprises nanocellulose and water;
 an inlet for a dispersion/drying agent;
 a twin-rotor mixer in communication with the nanocellulose slurry feed sub-system, wherein the twin-rotor mixer is configured for intimately mixing the nanocellulose slurry and the dispersion/drying agent, and wherein the twin-rotor mixer is configured with one or more mixer vents to remove at least a portion of the water from the nanocellulose slurry; and
 an optional milling device configured to generate a powder containing the nanocellulose-dispersion concentrate.

In some embodiments, the nanocellulose-slurry dewatering system comprises a mixing unit configured for mixing the nanocellulose slurry with the dispersion/drying agent.

In some embodiments, the inlet for the dispersion/drying agent is an inlet to the nanocellulose slurry feed sub-system. In some embodiments, the inlet for the dispersion/drying agent is an inlet to the twin-rotor mixer.

In some embodiments, the nanocellulose-slurry dewatering system comprises a nanocellulose slurry pre-concentration unit configured to remove at least a portion of the water from the nanocellulose slurry prior to water removal in the twin-rotor mixer. The nanocellulose slurry pre-concentration unit may be a centrifuge or filtration device, for example.

In some embodiments, the inlet for the dispersion/drying agent is an inlet to the nanocellulose slurry pre-concentration unit.

The twin-rotor mixer may be a co-rotating twin-rotor mixer or a counter-rotating twin-rotor mixer.

The present invention also provides a method to dewater and optionally dry a nanocellulose slurry, the method comprising:
 (a) providing a nanocellulose slurry comprising nanocellulose and water;
 (b) providing a dispersion/drying agent that is selected for compatibility with the nanocellulose;
 (c) in a twin-screw system (e.g., a twin-screw extruder or a twin-rotor mixer), intimately mixing the nanocellulose slurry and the dispersion/drying agent;
 (d) in the twin-screw system, removing at least a portion of the water from the nanocellulose slurry via one or more system vents, to generate a nanocellulose-dispersion concentrate;
 (e) optionally milling the nanocellulose-dispersion concentrate to generate a powder, which may or may not have residual moisture; and
 (f) recovering the nanocellulose-dispersion concentrate in solid form or liquid form.

In some embodiments, the nanocellulose slurry is pre-concentrated in a nanocellulose slurry pre-concentration step to remove at least a portion of the water from the nanocellulose slurry, prior to step (c). The nanocellulose slurry pre-concentration step may be centrifugation and/or filtration, for example. The dispersion/drying agent may be combined with the nanocellulose slurry prior to or after pre-concentrating, if a pre-concentration step is performed.

The dispersion/drying agent may be selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, for example.

In some embodiments, the dispersion/drying agent is added to the nanocellulose slurry prior to step (c). The dispersion/drying agent may be added directly to the twin-screw system, such as via an additive inlet port. Preferably, the nanocellulose slurry and dispersion/drying agent are mixed together, such as with an agitated mix tank or in-line mixer, before adding the mixture to the twin-screw system. In certain embodiments, the nanocellulose slurry feed sub-system is configured to agitate the nanocellulose slurry and dispersion/drying agent.

The twin-screw system may be a co-rotating twin-screw extruder, a counter-rotating twin-screw extruder, or another type of twin-screw extruder that is typically operated continuously. The twin-screw system may be a twin-rotor mixer operated in batch or semi-batch mode.

The twin-screw system may be operated with an average system temperature from about 120° C. to about 300° C., for example. The twin-screw system is preferably operated with a maximum system temperature that is less than the thermal-decomposition onset temperature of the nanocellulose, and that is also preferably less than the thermal-decomposition onset temperature of the dispersion/drying agent.

In some embodiments, the twin-screw system is a twin-screw extruder that contains a plurality of extruder zones, wherein zone temperatures for each of the extruder zones are independently controlled. In certain embodiments, the zone temperatures increase along the length of the twin-screw extruder.

The twin-screw system may be heated with a heat-transfer medium selected from the group consisting of steam, hot oil, electrical-heating elements, and combinations thereof. The twin-screw system may be cooled with a heat-transfer medium selected from the group consisting of cooling water, air, oil, and combinations thereof. Heating and cooling configurations may be designed based on the desired temperature profile along the length of the twin-screw system, the throughput, the materials present, shear rates, screw or rotor design, and other parameters.

The twin-screw system may be operated with an average nanocellulose residence time from about 30 seconds to about 30 minutes, for example. In a batch twin-rotor mixer, the residence time is the batch time.

In some embodiments, at least one of the system vents is operated under vacuum. When step (d) utilizes multiple system vents, each of the system vents may be operated under vacuum, or less than all of the system vents may be operated under vacuum.

In the nanocellulose-dispersion concentrate generated in step (d), nanocellulose may be present at a concentration of about 10 wt % to about 90 wt %, for example. The dispersion/drying agent may be present at a concentration of about 5 wt % to about 65 wt %, for example, in the nanocellulose-dispersion concentrate. In some embodiments, the weight ratio of the nanocellulose to the dispersion/drying agent is selected from about 0.5 to about 2 in the nanocellulose-dispersion concentrate.

The nanocellulose may include cellulose nanocrystals, cellulose nanofibrils, microfibrillated cellulose, or a combination thereof. In some embodiments, the nanocellulose includes lignin-containing nanocellulose. In certain embodiments, the nanocellulose includes lignin-coated nanocellulose.

Some methods do not necessarily employ a dispersion/drying agent. In some of these methods, a method to dewater and optionally dry a nanocellulose slurry comprises:
 (a) providing a nanocellulose slurry comprising nanocellulose and water;
 (b) optionally pre-concentrating the nanocellulose slurry, such as via centrifugation or filtration;
 (c) in a twin-screw system, shearing the nanocellulose slurry and removing at least a portion of the water from the nanocellulose slurry via one or more system vents, to generate dewatered nanocellulose;
 (d) optionally milling the nanocellulose-dispersion concentrate to generate a powder; and
 (e) recovering the dewatered nanocellulose in solid form or liquid form.

In the dewatered nanocellulose recovered in step (d), nanocellulose may be present at a concentration of about 10 wt % to about 25 wt %, for example.

BRIEF DESCRIPTION OF THE FIGURES

FIG. 2 is an exemplary flowchart depicting the process and principles of the invention, in some embodiments.

DETAILED DESCRIPTION OF SOME EMBODIMENTS

Figure 1:
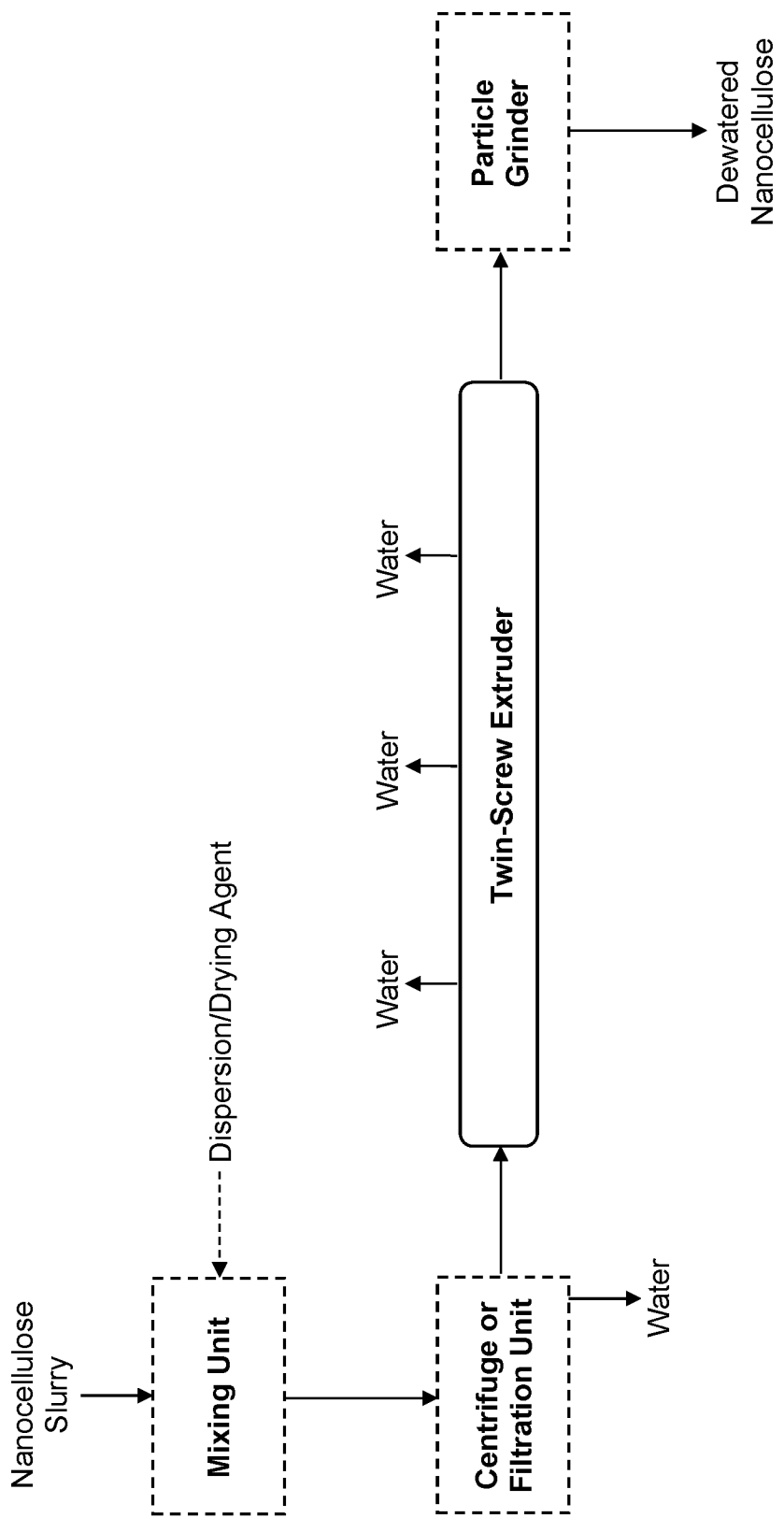
FIG. 1 is an exemplary block flow diagram depicting some systems and methods of the invention, in some embodiments, for dewatering and optionally drying nanocellulose slurries.
Figure 3:
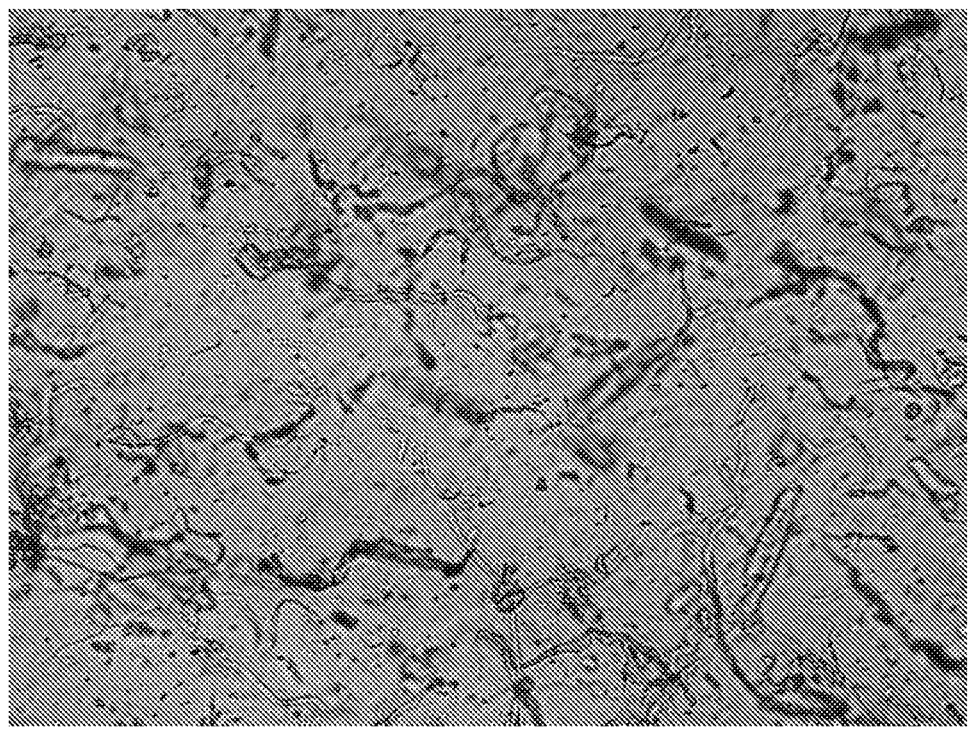
FIG. 3 is an optical micrograph (100× magnification) of the nanocellulose-polymer composite of Example 1 using a dispersion/drying agent, indicating evenly dispersed 2 wt % nanocellulose (lignin-coated nanofibrils) in polypropylene.
Figure 4:
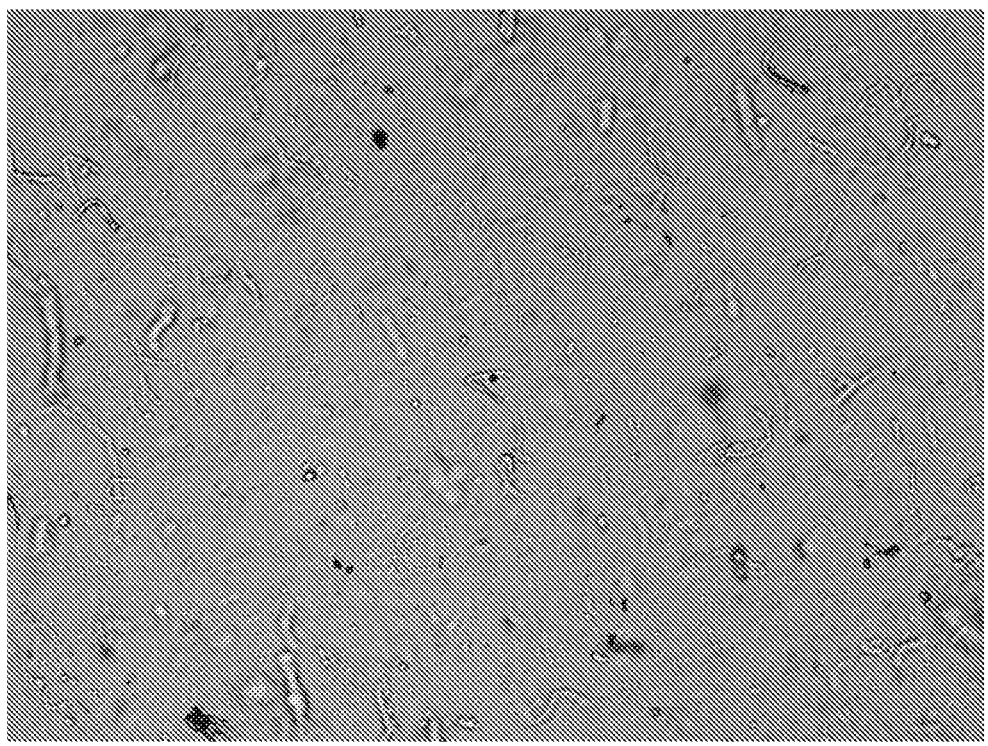
FIG. 4 is an optical micrograph (100× magnification) of the nanocellulose-polymer composite of Example 2 using a dispersion/drying agent, indicating evenly dispersed 2 wt % nanocellulose (lignin-coated nanofibrils) in polypropylene.
Figure 5:
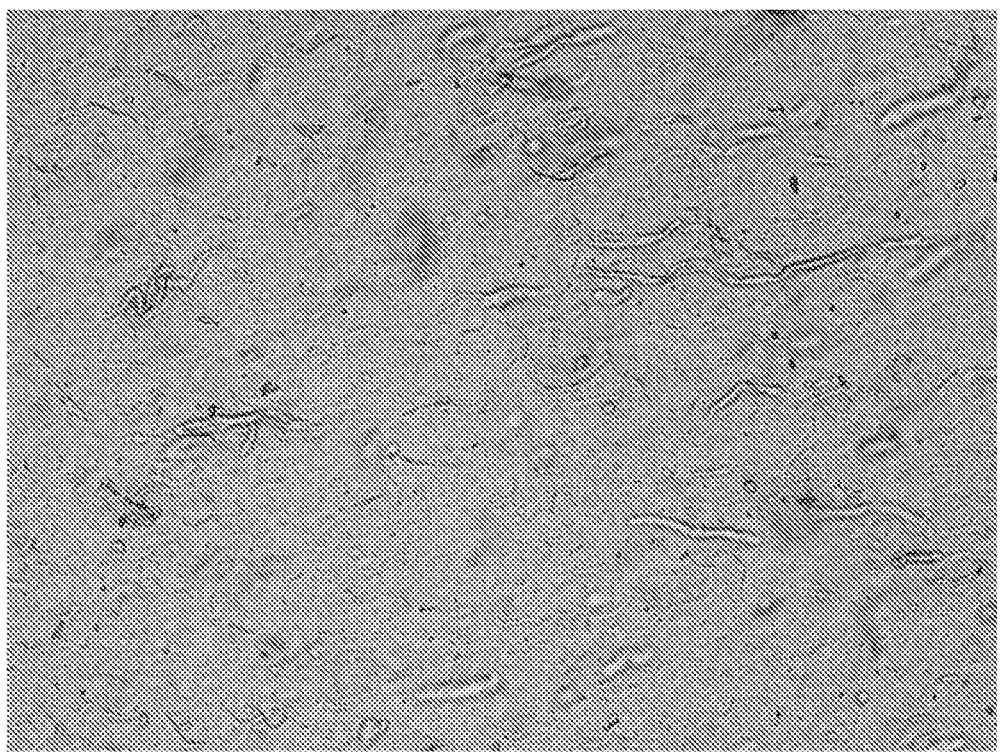
FIG. 5 is an optical micrograph (100× magnification) of the nanocellulose-polymer composite of Example 3 using a dispersion/drying agent, indicating evenly dispersed 2 wt % nanocellulose (lignin-coated nanofibrils) in polypropylene.
Figure 6:
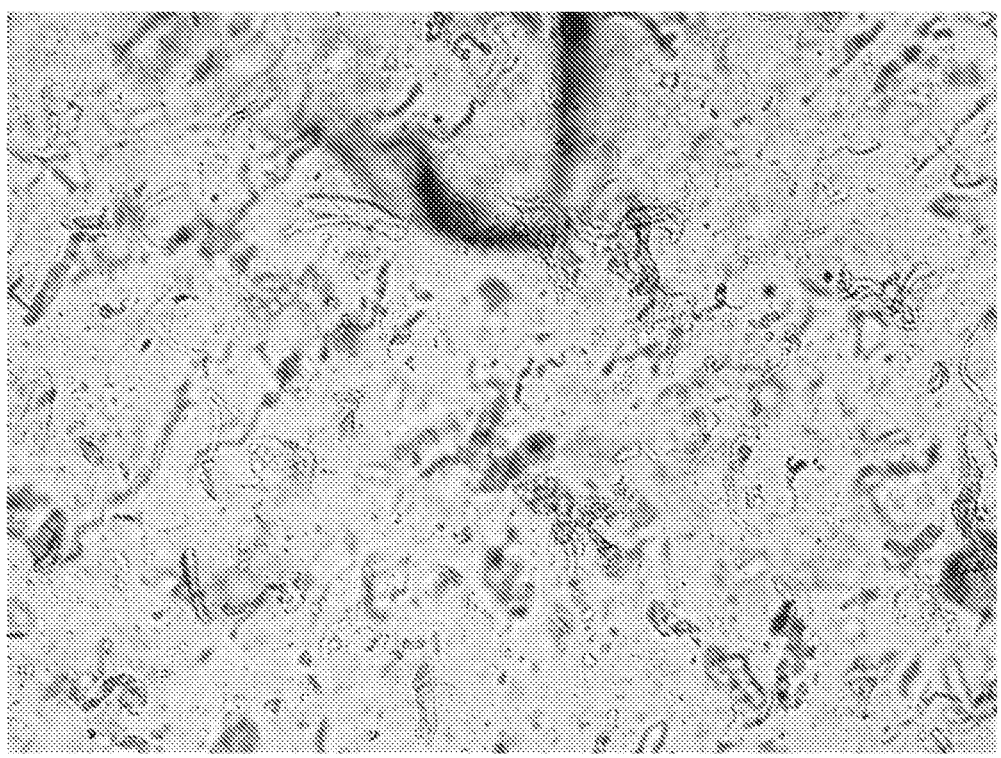
FIG. 6 is an optical micrograph (100× magnification) of the nanocellulose-polymer composite of Example 4 using a dispersion/drying agent, indicating evenly dispersed 2 wt % nanocellulose (lignin-coated nanofibrils) in polypropylene.
Figure 7:
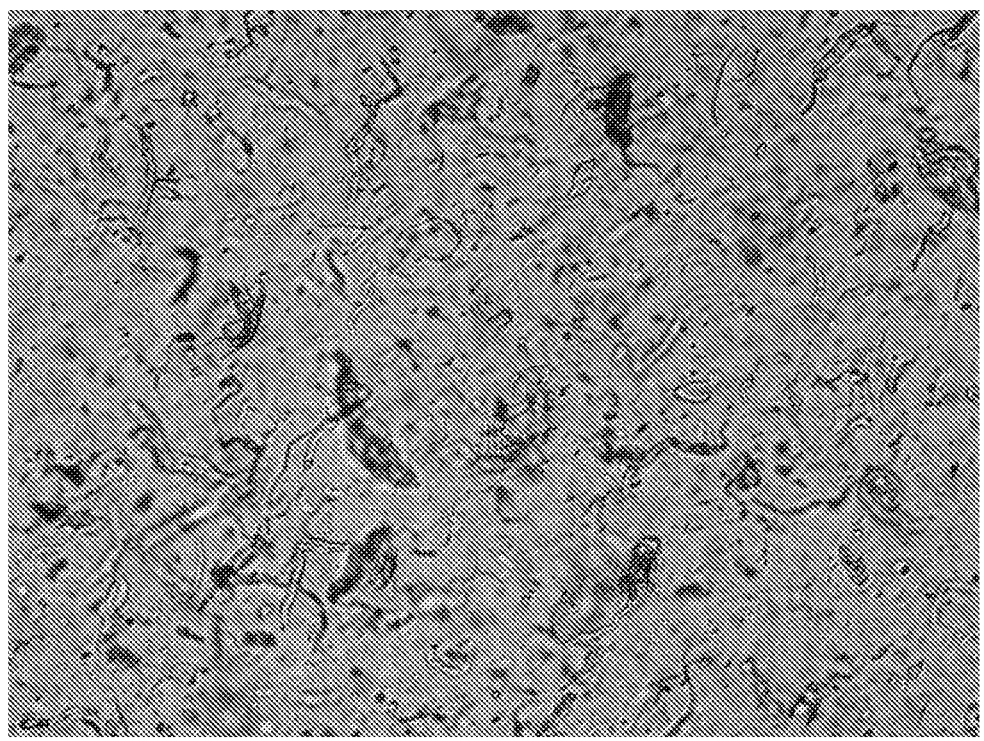
FIG. 7 is an optical micrograph (100× magnification) of the nanocellulose-polymer composite of Example 5 using a dispersion/drying agent, indicating evenly dispersed 2 wt % nanocellulose (lignin-coated nanofibrils) in polypropylene.
Figure 8:
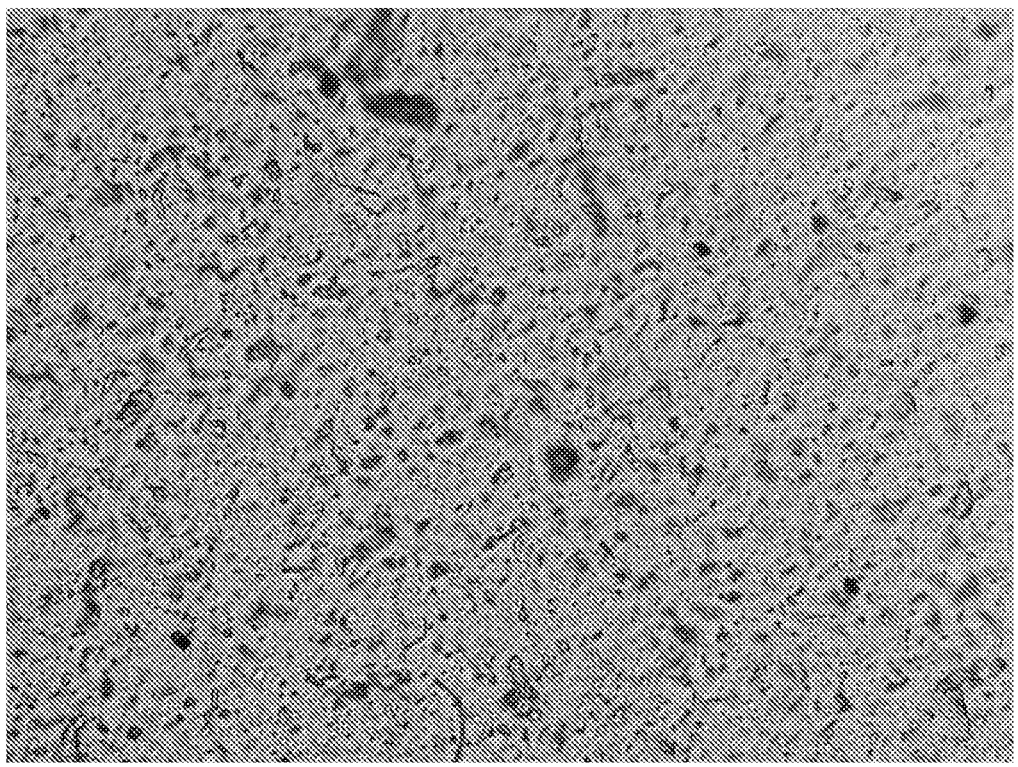
FIG. 8 is an optical micrograph (100× magnification) of the nanocellulose-polymer composite of Example 6 using a dispersion/drying agent, indicating evenly dispersed 0.5 wt % nanocellulose (lignin-coated nanocrystals) in polylactide.
Figure 9:
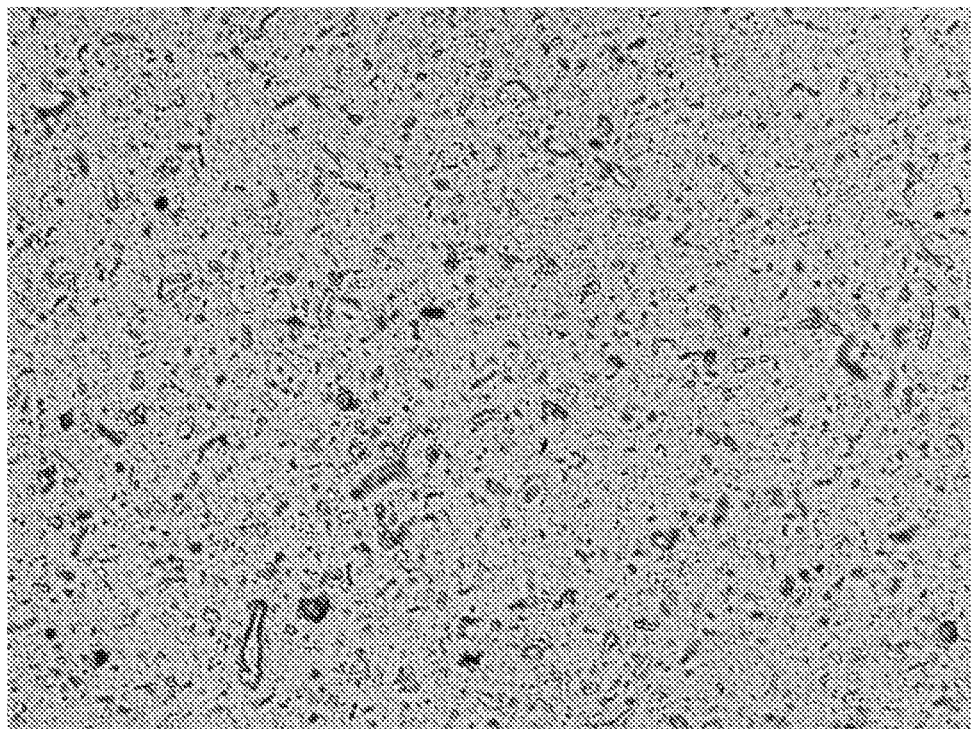
FIG. 9 is an optical micrograph (100× magnification) of the nanocellulose-polymer composite of Example 7 using a dispersion/drying agent, indicating evenly dispersed 0.5 wt % nanocellulose (lignin-coated nanocrystals) in polylactide.
Figure 10:
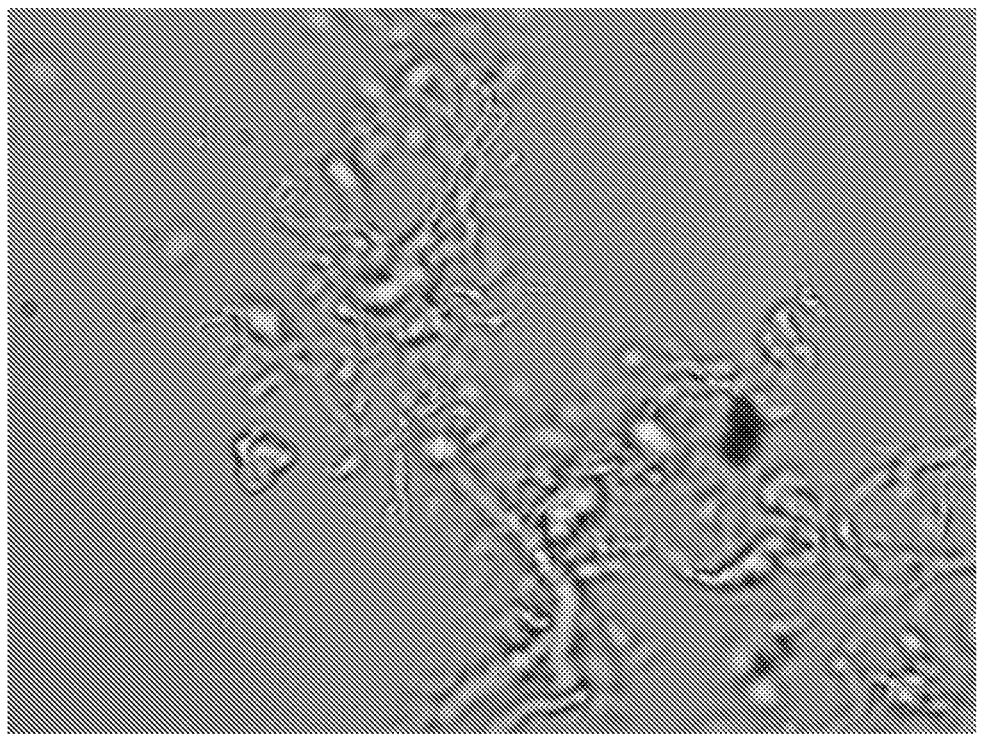
FIG. 10 is an optical micrograph (400× magnification) of the nanocellulose-containing composite of Example 8 using a dispersion/drying agent, indicating evenly dispersed 1.3 wt % nanocellulose (lignin-coated nanofibrils) in diisononyl phthalate.

This description enables one skilled in the art to make and use the invention, and describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. All composition numbers and ranges based on percentages are weight percentages, unless indicated otherwise. All ranges of numbers or conditions are meant to encompass any specific value contained within the range, rounded to any suitable decimal point.

Unless otherwise indicated, all numbers expressing parameters, reaction conditions, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention, in some variations, is predicated on dewatering and drying aqueous nanocellulose slurries using a twin-screw system (e.g., a twin-screw extruder) configured to allow release of water vapor. The present invention, in some variations, is also predicated on the selection and incorporation of a dispersion/drying agent for nanocellulose, wherein the dispersion/drying agent is added to the nanocellulose slurry which is dewatered in a twin-screw system. It has been discovered that a twin-screw system with one or more system vents, in conjunction with a dispersion/drying agent, works surprisingly well to dewater a nanocellulose slurry. As water is removed from the system vent(s), the dispersion/drying agent prevents the nanocellulose from agglomerating and irreversibly bonding with itself.

As explained in the Background, it is often desirable for composite products to incorporate distinct nanocellulose particles and prevent those particles from bonding together (agglomerating) during production or use. Nanocellulose is typically available as an aqueous dispersion, as produced from cellulosic biomass or through bacterial synthesis. In dilute aqueous dispersions, the nanocellulose particles remain non-agglomerated or reversibly agglomerated. For most polymer systems, for example, the aqueous dispersion itself cannot be introduced into a polymer matrix—the water needs to first be removed. Even for aqueous systems, additive products containing as little water as possible are preferred to minimize product delivery costs and the amount of water introduced to the end-use product system with the additive. It is generally unacceptable to introduce excess water into a product system along with the additive such that the product must then be dewatered or dried beyond normal levels.

The present invention is a breakthrough that allows the production of nanocellulose in dry or dewatered (concentrated) form, enabling incorporation in a wide range of plastics, elastomers, and adhesives, as well as non-polymer matrices including electronic inks, sealants, and other non-water-based applications. The present invention also provides methods to concentrate nanocellulose for shipping and storage purposes for dispersion in aqueous systems.

A "dispersion/drying agent" as intended herein is a chemical, or combination of chemicals, that functions to prevent irreversible agglomeration of nanocellulose while it is being dried or dewatered. The dispersion/drying agent disclosed herein is selected to retain distinct nanocellulose particles by preventing bonding between nanocellulose particles while the aqueous dispersion is being dried or dewatered (water removal). Without an effective dispersion/drying agent, irreversible bonding between nanocellulose particles has been observed through drying with heat to as low as about 20 wt % solids slurries. The dispersion/drying agent also retains distinct nanocellulose particles while the nanocellulose is being incorporated into a composite product, and effectively and easily releases the individual nanocellulose particles during composite product formulating so that the effectiveness of the nanocellulose is maximized. To reduce or prevent nanocellulose from bonding to itself during drying or dewatering, a dispersion/drying agent may be selected to interact sufficiently with the surface of the nanocellulose and/or distribute uniformly between nanocellulose particles, thereby reducing or preventing nanocellulose agglomeration.

In this patent application, "dewatering" means removal of liquid water from a nanocellulose slurry. "Drying" typically refers to a relatively high extent of dewatering, up to and including the removal of all water from the nanocellulose, using thermal energy.

In the specification, a "nanocellulose-dispersion concentrate" refers to a composition containing at least nanocellulose and a dispersion/drying agent. "Dewatered nanocellulose," "dried nanocellulose," "dewatered nanocellulose slurries," and the like refer to compositions containing nanocellulose and optionally containing a dispersion/drying agent.

Exemplary embodiments of the invention will now be described. These embodiments are not intended to limit the scope of the invention as claimed. The order of steps (or unit operations of a system) may be varied in any logical order, some steps or units may be omitted, and/or other steps or units may be added. Reference herein to first step, second step, etc. is for purposes of illustrating some embodiments only. Also, the locations of steps or units may vary, at one or multiple sites. Also, it should be understood that all references to "embodiments" are non-limiting and are considered to also be options with respect to any other disclosed embodiment, unless the context clearly dictates otherwise. In the drawings, dotted lines denote optional unit operations or streams.

Some variations of the invention provide a nanocellulose-slurry dewatering system comprising:
- a nanocellulose slurry feed sub-system, wherein the nanocellulose slurry comprises nanocellulose and water;
- an inlet for a dispersion/drying agent;
- a twin-screw extruder in flow communication with the nanocellulose slurry feed sub-system, wherein the twin-screw extruder is configured for intimately mixing the nanocellulose slurry and the dispersion/drying agent, and wherein the twin-screw extruder is configured with one or more extruder vents to remove at least a portion of the water from the nanocellulose slurry;
- an extruder outlet for recovering a nanocellulose-dispersion concentrate comprising the nanocellulose and the dispersion/drying agent; and
- an optional milling device configured to generate a powder containing the nanocellulose-dispersion concentrate.

In some embodiments, such as when processing dilute slurries (e.g., about 8 wt % solids or less), the nanocellulose slurry feed sub-system is configured with an internal rotating agitator and/or wiping blade to mix the nanocellulose slurry prior to the slurry being fed to the twin-screw extruder. A control valve may be used to meter the rate of addition of nanocellulose slurry from the feed sub-system to the twin-screw extruder.

In some embodiments, the nanocellulose-slurry dewatering system comprises a nanocellulose slurry pre-concentration unit configured to remove at least a portion of the water from the nanocellulose slurry prior to water removal in the extruder. Pre-concentrating the slurry is advantageous to reduce the overall volume being fed to the twin-screw extruder, which gives a higher capacity on a nanocellulose basis. The nanocellulose slurry pre-concentration unit may employ mechanical separation of water rather than thermal separation (water vaporization), to reduce overall energy costs. Mechanical separation means that separation is achieved using mechanical forces such as centrifugal or centripetal forces, or physical forces such as pressure causing water permeation through filtration media or a membrane.

For example, the nanocellulose slurry pre-concentration unit may be a centrifuge or a filtration device. An exemplary centrifuge is a decanter centrifuge employing high-speed rotation with centrifugal forces to separate nanocellulose, which has a higher density that that of water, from the water which is continuously removed (decanted). An exemplary filtration device is a pressure filter employing high-pressure air (or another inert gas) to create a mat of nanocellulose and a water-rich filtrate. Filtration devices include filter presses, belt presses, and the like.

When the nanocellulose slurry is pre-concentrated through the pre-concentration unit, to provide nanocellulose with higher than about 15 wt % solids, the nanocellulose feed sub-system may essentially consist of a traditional hopper feeding system. Hoppers are well-known for feeding moist solids to extruders. If the moist solids are not a free-flowing material, the hopper may be designed with a rotating agitator and/or wiping blade, or with hopper vibration, to prevent bridging of feed material.

In some embodiments, the inlet for the dispersion/drying agent is an inlet to the nanocellulose slurry feed sub-system, which may be the same inlet as the feed stream for the nanocellulose slurry or may be a separate inlet, as depicted in FIG. 1. In certain embodiments, the nanocellulose slurry and dispersion/drying agent are combined before feeding to the feed sub-system, such as following production of the nanocellulose slurry or even integrated with nanocellulose production. In other embodiments, the inlet for the dispersion/drying agent is an inlet directly to the twin-screw extruder, such as via a feed port (e.g., see FIG. 1) or a side port. There also may be inlets for the dispersion/drying agent both to the nanocellulose slurry feed sub-system as well as to the twin-screw extruder.

As intended herein, a "twin-screw system" is a machine that utilizes at least two solid screws or rotors that rotate (radially) with preferably small gaps between the screws or rotors, imparting significant shear forces onto a material being processed. In the present case of the material being a nanocellulose slurry, the high shear and preferably small gaps create a thin material layer with high surface area that is exposed for vaporization of water. The high shear forces enable intimate mixing of the nanocellulose slurry with the dispersion/drying agent. Also, in some cases, depending on the dispersion/drying agent used, as water is released, the intimate mixing provided by the twin screws or rotors leads to particle tumbling and grinding so that particle drying is relatively uniform.

The twin-screw system may be a continuous system, a semi-continuous system, a semi-batch system, or a batch system. When the twin-screw system is continuous or semi-continuous twin-screw extruder, material is continually conveyed axially through the system, from a feed sub-system to an extruder outlet, for some period of time. When the twin-screw system is a batch or semi-batch twin-rotor mixer, material is initially added to the system and then the system is typically closed, except for vents or water vapor removal, and then subjected to intimate mixing via high-shear forces caused by two rotors rotating radially with preferably small gaps between the rotors. After a period of time (batch time), the system is opened up and the processed material is recovered. In a semi-batch system, the system may be operated for a period of time and then material may be periodically added to, or withdrawn from, the system (e.g., water release may be intermittent, or dewatered nanocellulose may be periodically recovered through a valve). In the case of batch or semi-batch, the feed sub-system may be the vessel itself that may be initially loaded, and the system outlet may also be the vessel itself, following batch operation. See Examples 1-8 herein for examples of semi-batch twin-rotor mixers, and Examples 9-11 for examples of continuous twin-screw extruders.

In the case of the twin-screw system being a twin-screw extruder, the solid screws are typically fabricated from metals or metal alloys, such as stainless steel, optionally with ceramic coatings, such as chromium carbide. A screw may be fabricated as a single piece or may be segmented and assembled on a shaft. The screws may be arranged parallel to each other, or in a conical arrangement in which the screw axes are not parallel to each other but rather converge along the length of the extruder.

A twin-screw extruder may be a co-rotating twin-screw extruder, a counter-rotating twin-screw extruder, or another type of twin-screw extruder (e.g., a gear pump extruder). When two screws are designed to rotate in the same radial direction (co-rotation), the twin screws are co-rotating screws. When two screws are designed to rotate in the opposite radial direction, the twin screws are counter-rotating screws. The flights of the screws may be designed such that two screws intermesh with each other (intermeshed screws) or do not fully intermesh with each other (non-intermeshed screws). The screws are contained within one or more barrels that form external walls around the screws, thereby containing the material during processing.

For continuous systems, a counter-rotating twin-screw extruder has beneficial material feed and conveying characteristics. The residence time and material temperature control in a counter-rotating twin-screw extruder are also relatively uniform. However, air entrapment, generation of high pressure, and low maximum screw speed may be disadvantages. The advantages of a co-rotating twin-screw extruder are that the screws wipe each other clean (self-wiping), and high screw speeds and high outputs may be realized, along with good mixing. Co-rotating twin-screw extruders may also be desirable for reduced screw and barrel wear.

For continuous systems, screws may be designed to incorporate different screw elements along the screw length. Such screw elements may include, but are not limited to, flighted elements, mixing elements, and zoning elements. Flighted elements forward material past barrel ports, through mixers, and out of the extruder through a die. Mixing elements facilitate the mixing of the various components being processed. Zoning elements isolate two operations. Some elements may be multifunctional.

For continuous systems, the mixing efficiency of a twin-screw extruder can be increased by incorporating many mixing elements along the screws. These and other elements may be slotted onto a central shaft to build up a screw section. Preferably, the length, number, and form of the elements may be easily changed. The elements may take various forms such as reversed screw flights, kneading discs, pins, rotors, slotted vanes, blister rings, etc. Mixing elements may be designed to cause extensional mixing and planar shear to be imparted into the materials being processed, to facilitate dispersive mixing. Mixing elements may be designed to result in divisions and recombinations of the stream, to facilitate distributive mixing.

For continuous systems, the outside screw diameter, inside screw diameter, and channel depth are important twin-screw extruder design parameters as these parameters dictate the available free volume and torque (and thus radial shear forces). As the channel depth increases, the inside screw diameter decreases and results in less attainable shaft torque.

Generally speaking, screw design will be tailored to the specific application (e.g., type of nanocellulose, dispersion/drying agent, extent of dewatering desired, throughout, etc.). A skilled artisan in twin-screw extruders will be able to customize screw design using known principles and calculations.

This specification hereby incorporates by reference Goff et al., *The Dynisco Extrusion Processors Handbook*, 2nd edition, 2000, for its teachings of the principles and design parameters of twin-screw extruders. This specification also hereby incorporates by reference Martin, "Twin Screw Extruders as Continuous Mixers for Thermal Processing: a Technical and Historical Perspective", *AAPS PharmSciTech*, Vol. 17, No. 1, February 2016, for its teachings of various design and operation principles of twin-screw extruders.

Extruders employing three or more screws are within the scope of twin-screw extruders herein. In a three-screw extruder, all three screws may be co-rotating, or two screws may be co-rotating and one screw counter-rotating in relation to the radial direction of the other screws.

A gear pump extruder is a simple twin-screw extruder that moves a material through the action of two intermeshing gears, which are essentially screws or rotors with relatively short lengths. The gears are typically fabricated from metals or metal alloys, such as stainless steel, optionally with ceramic coatings, such as chromium carbide. When the two gears are designed to rotate in the same radial direction (co-rotation), the gear pump extruder is a co-rotating gear pump extruder. When the two gears are designed to rotate in the opposite radial direction, the gear pump extruder is a counter-rotating gear pump extruder. The flights of the gears may be designed such that the two gears intermesh with each other or do not fully intermesh with each other.

In some embodiments, the twin-screw system is a gear pump extruder that is operated in batch rather than continuously. The intermeshing gears may be designed to co-rotate or counter-rotate, and the flights of the gears may be designed such that the two gears intermesh with each other or do not fully intermesh with each other. The gear pump extruder is initially loaded with the nanocellulose slurry and optionally a dispersion-drying agent. The batch gear pump is operated for a period of time (batch time) to allow intimate, high-shearing mixing and release of water vapor out of a vent.

In some embodiments, the twin-screw system is a batch or semi-batch twin-rotor mixer. The twin-rotor mixer is configured with two rotors that may be intermeshing or non-intermeshing. The two rotors rotate (radially), imparting significant shear forces onto a material being processed. The high shear forces enable intimate mixing of the nanocellulose slurry with the dispersion/drying agent. The rotors are typically fabricated from metals or metal alloys, such as stainless steel, optionally with ceramic coatings, such as chromium carbide. The two rotors may be designed to rotate in the same radial direction (co-rotation) or in the opposite radial direction (counter-rotation). Examples 1-8 of this specification utilize semi-batch twin-rotor mixers. In principle, such twin-rotor mixers may be scaled up to commercial scale.

A twin-rotor mixer contains a cavity (or mixing chamber) with vaned rotors, where vanes pump and intimately mix material in opposite directions. The rotors of a twin-rotor mixer may be designed such that the number, shape, and angles of the vanes are optimized for the particular application. Rotors generally have two or four flights, but other numbers of flights are possible. The rotors of a twin-rotor mixer may be selected from tangential rotors, roller rotors, delta rotors, cam rotors, Sigma rotors, Banbury rotors, or other industrially available rotors, for example. In some embodiments of twin-rotor mixers, two rotors rotate toward each other at slightly different speeds. Each rotor has a blade that extends along the length of the rotor roughly in the form of a spiral. Each rotor may be cored to permit cooling or heating by the passage of water or of an appropriate heating agent. An example of a commercial-scale two-wing rotor is the well-known Banbury design.

For batch or semi-batch systems, the mixing efficiency of a twin-rotor mixer can be increased by incorporating many mixing elements in the rotors. The rotor elements may take various forms. Rotor mixing elements may be designed to cause extensional mixing and planar shear to be imparted into the materials being processed, to facilitate dispersive mixing. Rotor mixing elements may be designed to result in divisions and recombinations of the stream, to facilitate distributive mixing. Generally speaking, rotor design will be tailored to the specific application (e.g., type of nanocellulose, dispersion/drying agent, extent of dewatering desired, throughout, etc.). A skilled artisan in twin-rotor mixers will be able to customize rotor design using known principles and calculations.

The twin-screw system may be designed to operate with an average system temperature from about 120° C. to about 300° C., for example. The twin-screw system is preferably designed to operate with a maximum system temperature that is less than the thermal-decomposition onset temperature of the nanocellulose being dewatered or dried and that is preferably less than the thermal-decomposition onset temperature of the dispersion/drying agent. In some embodiments, when the twin-screw system is a twin-screw extruder, there is a plurality of extruder zones, wherein zone temperatures for each of the extruder zones may be independently controlled, such as via a control panel or computer interface. When the twin-screw system is a batch or semi-batch twin-rotor mixer, the mixer may be operated at a single temperature or at a time-varying temperature, if desired.

The twin-screw system may be heated with a heat-transfer medium selected from the group consisting of steam, hot oil, electrical-heating elements, and combinations thereof. The twin-screw system may be cooled with a heat-transfer medium selected from the group consisting of cooling water, air, oil, and combinations thereof. In the case of a twin-screw extruder, heating and cooling configurations may be designed based on the desired temperature profile along the length of the twin-screw extruder, the throughput, the materials present, shear rates, screw design, and other parameters.

In some embodiments, the twin-screw system is electrically heated using resistance coils, bands, or cuffs that are strapped or bolted around a barrel or mixer bowl. Upon demand, such as initiated by a thermocouple, electrical current is passed through the resistance wire, inside the coil. The resistance produces heat that increases the barrel or mixer bowl temperature, and the system internal temperature via heat transfer. For a twin-screw extruder, the resistance settings required to achieve a desired temperature will depend on the screw rotational speed, the pressure within the system, and the throughput.

In some embodiments, a twin-screw extruder is configured with steam heating for one or more barrels. Upon demand, such as initiated by a thermocouple, steam is introduced to the barrel surface for indirect heating (i.e., steam is not introduced directly into the extruder), thereby increasing the barrel temperature and the extruder internal temperature via heat transfer. For a twin-screw extruder, the steam pressure and flow rate to achieve a desired temperature will depend on the screw rotational speed, the pressure within the system, and the throughput.

In some embodiments, a twin-screw extruder is equipped with an air-cooling system to reduce temperature when too much heating has occurred (e.g., electrical heating exceeds set point, or shear heating has become excessive). An exemplary air-cooling system consists of fans that circulate air around the barrel on demand.

In some embodiments, a twin-screw extruder is equipped with a liquid cooling system, such as a closed-loop heat exchanger using cooling water contained inside a sealed coil surrounding the barrel. When a set-point temperature is exceeded, the vapor from this cooling water is cooled by water flow so that the cooling water vapor condenses to absorb more heat.

The twin-screw system is preferably configured with one or more system vents to remove at least some of the water from the nanocellulose slurry. A "vent" is a port, adjustable valve, pressure-relief valve, pressure-relief disk, water-permeable membrane, or other device that allows water vapor to be released from the system. A vent may be normally-open or normally-closed, e.g. the vent may be designed only to open when there is sufficient outward vapor pressure or upon demand. In the case of a twin-screw extruder, a vent may be referred to as an extruder vent. In the case of a twin-rotor mixer, a vent may be referred to as a mixer vent.

In some embodiments of a twin-screw extruder, an extruder vent is built into a barrel. In these or other embodiments, an extruder vent may be configured in a vent ring or other vent element between axially adjacent barrels. In the case of a gear pump extruder, an extruder vent may be built into gear box, the case seal, or the suction port, for example.

Generally, a system vent allows for volatiles, such as water vapor, and entrapped air to be removed from the system. In the present invention, dewatering or drying of the nanocellulose slurry means that at least water is removed. Other components may be removed from a system vent, sometimes unintentionally (e.g., minor entrainment of solids). In some embodiments, the system vent allows removal not only of some water but also removal of components derived from the nanocellulose production process, such as acids, sugar-degradation compounds, or lignin-derived compounds.

The number of system vents may vary, such as 1, 2, 3, 4, 5, or more, depending on the total length of a twin-screw extruder or the total volume of a twin-rotor mixer, for example. The placement of extruder vents may vary along the length of the twin-screw extruder. For example, when there is an increasing temperature profile along the extruder length, an extruder vent may be placed near the end of the extruder where water vaporization is faster or more thermodynamically favorable.

A system vent may allow vapors to escape to the atmosphere or may be adapted to a flow line such that the vapors may be captured and potentially reused for other purposes, or analyzed for composition, for example. The flow line may be in communication with a vacuum system, such that the vent is under vacuum. When multiple vents are utilized, each of the vents may be sized the same or differently, i.e. one vent may have a larger opening area (for more vapor release) than another vent.

In some embodiments, at least one of the system vents is operated under vacuum. When multiple system vents are utilized, each of the system vents may be operated under vacuum, or less than all of the system vents may be operated under vacuum. The vacuum pressure may be from about 0.01 bar to about 0.99 bar (absolute pressure), such as about 0.05, 0.1, 0.2, 0.3, 0.4, 0.5, 0.6, 0.7, 0.8, 0.9, 0.95 bar. When there are multiple system vents, they may be operated at the same pressure or at different pressures. As an illustration, if there are three system vents (as implied in FIG. 1), all three vents may be connected to a common vacuum system that operates at −0.9 bar gauge pressure, which is 0.1 bar absolute pressure. Or, for example, two system vents may be at 0.5 bar pressure while one vent is at atmospheric pressure (1 bar).

A twin-screw extruder outlet typically is configured with an extruder die. The extruder die is the assembly, located at the end of the extruder, which contains an orifice to allow dewatered nanocellulose to flow out. The extruder die is a block of metal or metal alloy, which may be the same material as the screws and/or the barrels. In certain embodiments, an extruder vent is configured as part of the extruder die at or near the extruder outlet. Also note that when the extruder outlet is open to the atmosphere, an additional amount of water vapor release may take place.

In addition to number and size of extruder vents and the vacuum levels, other parameters may dictate the efficiency of water removal from a twin-screw extruder. For example, longer residence times specifically in the zone(s) with an extruder vent will help since there is more time for water mass transport to the vent. Screw design may be optimized such that one or more screw elements enhance water flashing and removal out of the extruder vent(s). A higher surface area of the mixture, from high shear rates, may assist by reducing diffusion and/or convection mass-transport limitations. Of course, the temperature and pressure within the extruder, or within extruder zones, will dictate whether water is present in liquid or vapor states, at thermodynamic equilibrium. True equilibrium may or may not be present.

One skilled in the art of chemical engineering can experiment with the twin-screw system and vary the number and size of vents, the vacuum pressures, screw or rotor design, and the process conditions within the system to determine the number of vents required to achieve a desired extent of dewatering or drying. Alternatively, or additionally, one skilled in the art of chemical engineering can simulate the twin-screw system and vary the number of vents, the vacuum pressures, and the process conditions to calculate or estimate the number of vents required to achieve a desired extent of dewatering or drying. For example, it may be assumed that each vent can be modeled as one equilibrium flash stage with full vapor disengagement and no solids entrainment. In reality, due to high surface area (thin film) in the twin-screw system, there may be more than one equilibrium flash occurring at each vent.

When the optional milling device is present, the milling device may be connected directly to the system outlet, such that the system outlet (e.g., extruder outlet) is essentially the milling device inlet. Alternatively, the nanocellulose-dispersion concentrate may be collected from the outlet and then, at potentially a later time and/or at a different location, introduced to the milling device. The milling device may be selected from a hammer mill, a ball mill, a jet mill, an impact crusher, a pulverizer, a cage mill, a grinder, or an extruder, for example. The milling device may be operated to reduce the particle size of the nanocellulose-dispersion concentrate, such as to an average size range of about 10 microns to about 1 millimeter, e.g. about 25, 50, 100, 200, 300, 400, 500, 600, 700, 800, 900, or 950 microns.

Some variations of the invention do not necessarily employ a dispersion/drying agent. In some of these variations, a nanocellulose-slurry dewatering system comprises:
  a nanocellulose slurry feed sub-system, wherein the nanocellulose slurry comprises nanocellulose and water;
  a twin-screw system in communication with the nanocellulose slurry feed sub-system, wherein the twin-screw extruder is configured for shearing the nanocellulose slurry, and wherein the twin-screw extruder is configured with one or more system vents to remove at least a portion of the water from the nanocellulose slurry;
  an optional milling device configured to generate a powder containing the nanocellulose slurry; and
  an outlet for recovering dewatered nanocellulose.

The present invention provides both systems and methods, as indicated above. The exemplary diagram of FIG. 1 illustrates both a system in which system elements (e.g., a twin-screw extruder) are shown, as well as a method in which method steps (e.g., conveyance through a twin-screw extruder) are shown. In FIG. 1, the dispersion/drying agent is optional, although preferred. The mixing unit for mixing the nanocellulose slurry with the dispersion/drying agent is optional. Also, the centrifuge or filtration unit, for pre-concentrating the nanocellulose slurry, is optional. In some preferred embodiments, the dispersion/drying agent is used and the centrifuge or filtration unit is included. The particle grinder is optional.

FIG. 2 provides an exemplary flowchart depicting some methods of the invention. The method to dewater or dry a nanocellulose slurry may be continuous, semi-continuous, or batch.

The present invention provides a method to dewater and optionally dry a nanocellulose slurry, the method comprising:
  (a) providing a nanocellulose slurry comprising nanocellulose and water;
  (b) providing a dispersion/drying agent that is selected for compatibility with the nanocellulose and preferably selected for compatibility with the end-use application;
  (c) in a twin-screw system (e.g., a twin-screw extruder or a twin-rotor mixer), intimately mixing the nanocellulose slurry and the dispersion/drying agent;
  (d) in the twin-screw system, removing at least a portion of the water from the nanocellulose slurry via one or more system vents, to generate a nanocellulose-dispersion concentrate;
  (e) optionally milling the nanocellulose-dispersion concentrate to generate a powder which may or may not have residual moisture; and
  (f) recovering the nanocellulose-dispersion concentrate in solid form or liquid form.

In some embodiments, the nanocellulose slurry is pre-concentrated in a nanocellulose slurry pre-concentration step to remove at least a portion of the water from the nanocellulose slurry, prior to step (c). The nanocellulose slurry pre-concentration step may be centrifugation and/or filtration, for example.

The dispersion/drying agent may be selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, for example. Additional discussion of various dispersion/drying agent can be found later in this specification In some embodiments, the dispersion/drying agent is added to the nanocellulose slurry prior to step (c). In these or other embodiments, the dispersion/drying agent may be added directly to the twin-screw system, such as via an additive inlet port. Preferably, the nanocellulose slurry and dispersion/drying agent are mixed together in a mixing unit (see FIG. 1), such as an agitated mix tank or in-line mixer, before adding the mixture to the twin-screw system. In certain embodiments, the nanocellulose slurry feed sub-system is configured to agitate the nanocellulose slurry and dispersion/drying agent.

The twin-screw system may be a twin-screw extruder, such as a co-rotating twin-screw extruder, a counter-rotating twin-screw extruder, or another type of twin-screw extruder (e.g., a gear pump extruder). Some design and operation principles of twin-screw extruders were discussed above.

The twin-screw system temperature is preferably monitored and controlled. The system temperature refers to the temperature of the material internally in the system, not the outer barrel or mixer bowl temperature, although the barrel or mixer bowl temperature may be measured and correlated with the system temperature. When a twin-screw extruder contains a plurality of extruder zones, it is preferred that zone temperatures for each of the extruder zones are independently monitored and controlled. Control of temperature may utilize programmable control logic executed by a computer using well-known techniques.

The twin-screw system may be operated with an average system temperature from about 120° C. to about 250° C., for example. The average system temperature may be calculated as the average of all temperatures measured, or may be estimated based on temperature measurements and other parameters (e.g., amount of water released, solids concentration at outlet, etc.). In a continuous twin-extruder extruder, zone temperatures may be measured, i.e. temperatures at different spatial points. In a batch or semi-batch twin-rotor mixer, temperatures at different points in time may be measured, and the system may be at a constant temperature or a time-varying temperature. In the case of a twin-screw extruder, even at a given extruder zone, a measured temperature represents an average within that zone, as the local temperature profile around and between the screws is usually complex. In various embodiments, the average extruder temperature is about, at least about, or at most about 120° C., 125° C., 130° C., 135° C., 140° C., 145° C., 150° C., 160° C., 170° C., 180° C., 190° C., 200° C., 210° C., 220° C., 230° C., 240° C., or 250° C.

The twin-screw system may be operated with a maximum extruder temperature from about 150° C. to about 300° C., for example. In various embodiments, the maximum system temperature is about, or at most about 150° C., 160° C., 170° C., 180° C., 190° C., 200° C., 210° C., 220° C., 230° C., 240° C., 250° C., 260° C., 270° C., 280° C., 290° C., or 300° C. The twin-screw system is preferably operated with a maximum system temperature that is less than the thermal-decomposition onset temperature of the nanocellulose (defined below).

In certain continuous embodiments, the zone temperatures increase along the length of the twin-screw extruder. In other certain embodiments, zone temperatures decrease along the length of the twin-screw extruder. It is also possible to have non-monotonic temperature profiles along the extruder.

The twin-screw system may be heated with a heat-transfer medium selected from the group consisting of steam, hot oil, electrical-heating elements, and combinations thereof. The twin-screw system may be cooled with a heat-transfer medium selected from the group consisting of cooling water, air, oil, and combinations thereof. Heating and cooling configurations may be designed based on the desired temperature profile, the throughput, the materials present, shear rates, screw or rotor design, and other parameters.

A continuous twin-screw extruder may be operated with a wide range of shear rates, including axial shear rates and radial shear rates. Without limiting the scope of the present invention in any way, the twin-screw extruder may be operated with an average axial shear rate from about $10\ s^{-1}$ to about $200\ s^{-1}$, for example, such as about, or at least about, 20, 30, 40, 50, 60, 70, 80, 90, 100, 110, 120, 130, 140, 150, 160, 170, 180, or $190\ s^{-1}$. Without limiting the scope of the present invention in any way, the twin-screw extruder may be operated with an average radial shear rate from about $100\ s^{-1}$ to about $10000\ s^{-1}$ ($10^3/s$), for example, such as about, or at least about, 110, 125, 150, 200, 300, 400, 500, 1000, 2000, 3000, 4000, or $5000\ s^{-1}$. Typically, radial shear rates are significantly higher than axial shear rates. Note that local shear rates can be substantially higher than average shear rates, especially for radial shear.

A batch or semi-batch twin-rotor mixer may be operated with a wide range of shear rates. Without limiting the scope of the present invention in any way, the twin-rotor mixer may be operated with an average radial shear rate from about $10\ s^{-1}$ to about $10000\ s^{-1}$, for example, such as about, or at least about, 25, 50, 100, 125, 150, 200, 300, 400, 500, 1000, 2000, 3000, 4000, or $5000\ s^{-1}$.

The twin-screw system may be operated with an average nanocellulose residence time from about 30 seconds to about 120 minutes, for example. In various embodiments, the average nanocellulose residence time is about, at least about, or at most about 0.1, 0.2, 0.3, 0.4, 0.5, 0.6, 0.7, 0.8, 0.9, 1, 2, 3, 4, 5, 6, 7, 8, 9, 10, 15, 20, 30, 40, 50, 60, 70, 80, 90, or 100 minutes. When the twin-screw system is a batch system, the residence time is the batch time (e.g., in Example 1, the residence time is 90 minutes).

The residence time of the water will generally be different, both because a multiphase system has distinct residence-time distributions for different phases, and because at least some of the water exits from the twin-screw extruder. In various embodiments, the average water residence time is about, at least about, or at most about 0.1, 0.2, 0.3, 0.4, 0.5, 0.6, 0.7, 0.8, 0.9, 1, 2, 3, 4, 5, 6, 7, 8, 9, or 10 minutes.

The residence-time distributions of materials in a twin-screw extruder will depend on whether the extruder is fully filled or starve-fed. A fully filled extruder means that during operation, there is material in all of the internal volume, except for entrapped air. In a starve-fed extruder, during operation there are internal extruder regions that do not contain material (nanocellulose or water). The more filled the screw gaps, the tighter the nanocellulose residence-time distribution; conversely, the more starved the screws, the wider the nanocellulose residence-time distribution. Starved screws may give a flow pattern that is more well-mixed in the axial direction compared to fully filled plug flow. Axial mixing may be desirable for water removal because the local residence time and mass transport of water in axially mixed zones with extruder vents may be higher.

In some embodiments, at least one of the system vents is operated under vacuum. When step (d) utilizes multiple system vents, each of the system vents may be operated under vacuum, or less than all of the system vents may be operated under vacuum.

In the nanocellulose-dispersion concentrate generated in step (d), the nanocellulose may be present at a concentration of about 10 wt % to about 90 wt %, for example.

The starting nanocellulose slurry may itself have a range of nanocellulose concentrations, such as about 1 wt % to about 10 wt %, e.g. about, or at least about, or at most about 2, 3, 4, 5, 6, 7, 8, or 9 wt % nanocellulose. When a pre-concentration step (e.g., centrifugation) is employed, the nanocellulose slurry fed to the twin-screw system may have a wide range of nanocellulose concentration, such as about 10 wt % to about 40 wt %, e.g. about, or at least about, or at most about 5, 10, 15, 20, or 25 wt % nanocellulose.

In various embodiments of the invention, the nanocellulose-dispersion concentrate may have a nanocellulose concentration on a dry-weight basis of about, or at least about, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %, including all intervening ranges. In certain embodiments that extensively dewater or dry the nanocellulose slurry, the nanocellulose-dispersion concentrate may have a nanocellulose concentration on a dry-weight basis of about, or at least about, 50, 55, 60, 65, 70, 75, 80, 85, 90, 95, 99, 99.5, 99.9, or 100 wt %, including all intervening ranges. The remainder of the nanocellulose-dispersion concentrate that is not nanocellulose may be water, dispersion/drying agent, and potentially other additives.

In various embodiments, the extent of water removal from the nanocellulose slurry, out of the twin-screw system, may vary from about 10% to 100%, calculated as water removed from nanocellulose slurry divided by total water present in the material fed to the extruder. The extent of water removal may be about, or at least about, 15%, 20%, 25%, 30%, 35%, 40%, 45%, 50%, 55%, 60%, 65%, 70%, 75%, 80%, 85%, 90%, 95%, or 99%, including all intervening ranges.

In various embodiments employing a pre-concentration step, the extent of water removal from the nanocellulose slurry, from the overall system (mechanical separation in pre-concentration unit plus thermal separation in twin-screw system), may vary from about 25% to 100%, calculated as water removed from nanocellulose slurry divided by total water present in the material fed to the twin-screw system. The extent of water removal may be about, or at least about, 30%, 35%, 40%, 45%, 50%, 55%, 60%, 65%, 70%, 75%, 80%, 85%, 90%, 95%, 99%, or 100%, including all intervening ranges. In these embodiments, the water removed from the pre-concentration step may be from about 10% to about 90% of the total water removed from the system, for example.

The dispersion/drying agent may be present at a concentration of about 5 wt % to about 65 wt %, for example, in the nanocellulose-dispersion concentrate. In some embodiments, the weight ratio of the nanocellulose to the dispersion/drying agent is selected from about 0.5 to about 2 in the nanocellulose-dispersion concentrate.

The nanocellulose may include cellulose nanocrystals, cellulose nanofibrils, microfibrillated cellulose, or a combination thereof. In some embodiments, the nanocellulose includes lignin-containing nanocellulose. In certain embodiments, the nanocellulose includes lignin-coated nanocellulose.

Some methods do not necessarily employ a dispersion/drying agent. In some of these methods, a method to dewater a nanocellulose slurry comprises:
(a) providing a nanocellulose slurry comprising nanocellulose and water;
(b) optionally pre-concentrating the nanocellulose slurry, such as via centrifugation or filtration;
(c) in a twin-screw system, shearing the nanocellulose slurry and removing at least a portion of the water from the nanocellulose slurry via one or more system vents, to generate dewatered nanocellulose;
(d) optionally milling the nanocellulose-dispersion concentrate to generate a powder; and
(e) recovering the dewatered nanocellulose in solid form or liquid form.

When a dispersion/drying agent is not used, it may be suitable not to dewater as extensively, to avoid irreversible agglomeration of nanocellulose. In the dewatered nanocellulose recovered in step (d) above, the nanocellulose may be present at a concentration of about 10 wt % to about 25 wt %, for example. In various embodiments of dewatering nanocellulose without using a dispersion/drying agent, the dewatered nanocellulose may have a nanocellulose concentration on a dry-weight basis of about, or at least about, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %, including all intervening ranges.

As a rule of thumb, but without limitation, nanocellulose slurries may be dewatered to approximately 10-25 wt % nanocellulose before irreversible agglomeration starts to become significant, depending on drying temperature profile. Notwithstanding that rule of thumb, the use of a twin-screw extruder—even without any dispersion/drying agents—provides benefits arising from the especially intimate mixing that takes place in a twin-screw extruder. For example, the extent of nanocellulose agglomeration or reversibility of agglomeration may be improved when a twin-screw system is used for dewatering or drying, compared to other devices, independent of the dispersion/drying agent (if any). It is preferable, however, to employ a dispersion/drying agent in this invention, especially when extensively dewatering (e.g., complete drying) the nanocellulose slurry.

In various embodiments of dewatering or drying nanocellulose without using a dispersion/drying agent, the extent of water removal from the nanocellulose slurry, out of the twin-screw extruder, may vary from about 10% to 100%. The extent of water removal may be about, or at least about, 15%, 20%, 25%, 30%, 35%, 40%, 45%, 50%, 55%, 60%, 65%, 70%, 75%, 80%, 85%, 90%, 95%, or 99%, including all intervening ranges.

In various embodiments employing a pre-concentration step but no dispersion/drying agent, the extent of water removal from the nanocellulose slurry, from the overall system (mechanical separation in pre-concentration unit plus thermal separation in twin-screw system), may vary from about 25% to 100%, calculated as water removed from nanocellulose slurry divided by total water present in the material fed to the extruder. The extent of water removal may be about, or at least about, 30%, 35%, 40%, 45%, 50%, 55%, 60%, 65%, 70%, 75%, 80%, 85%, 90%, 95%, or 99%, including all intervening ranges. In these embodiments, the water removed from the pre-concentration step may be from about 10% to about 90% of the total water removed from the system, for example.

Some variations may be used to produce a nanocellulose-dispersion concentrate comprising:
(a) from about 5 wt % to about 90 wt % nanocellulose; and
(b) from about 5 wt % to about 95 wt % dispersion/drying agent selected for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof,
and wherein the nanocellulose-dispersion concentrate is in solid form or liquid form.

In some embodiments, the nanocellulose is present at a concentration of about 10 wt % to about 90 wt %, and the dispersion/drying agent is present at a concentration of about 5 wt % to about 65 wt %. In various embodiments, the nanocellulose is present at a concentration of about, at least about, or at most about 5, 10, 15, 20, 25, 30, 35, 40, 45, 50, 55, 60, 65, 70, 75, 80, 85, or 90 wt %, including all intervening ranges. In these or other embodiments, the dispersion/drying agent is present at a concentration of about, at least about, or at most about 5, 10, 15, 20, 25, 30, 35, 40, 45, 50, 55, 60, 65, 70, 75, 80, 85, 90, or 95 wt %, including all intervening ranges.

In some embodiments, the sum of nanocellulose and dispersion/drying agent is about, at least about, or at most about 10, 15, 20, 25, 30, 35, 40, 45, 50, 55, 60, 65, 70, 75, 80, 85, 90, 95, 99, or 100 wt %. The nanocellulose-dispersion concentrate may consist essentially of the nanocellulose and the dispersion/drying agent, i.e. without any other functional components present.

In some embodiments, the weight ratio of nanocellulose to dispersion/drying agent is selected from about 0.5 to about 2. In various embodiments, the weight ratio of nanocellulose to dispersion/drying agent is about, at least about, or at most about 0.1, 0.2, 0.5, 0.75, 0.9, 1, 1.1, 1.25, 1.5, 1.8, 2, 3, 4, 5, 6, 7, 8, 9, or 10, including all intervening ranges.

The nanocellulose-dispersion concentrate may be completely dry, or may contain water at a concentration from about 0.1 wt % to about 90 wt %. In various embodiments, the nanocellulose-dispersion concentrate contains about, or at most about, 0.1, 0.2, 0.3, 0.4, 0.5, 1, 2, 3, 4, 5, 10, 15, 20, 25, 30, 35, 40, 45, 50, 60, or 70 wt % water, including all intervening ranges.

The nanocellulose-dispersion concentrate may further comprise a liquid solvent, such as a polar liquid solvent selected from the group consisting of water, $C_1$-$C_8$ alcohols, $C_2$-$C_8$ polyols, and combinations thereof. Additionally, or alternatively, non-polar liquid solvents may be present, such as aromatic hydrocarbons, e.g. toluene, xylenes, or lignin derivatives.

In some embodiments, the nanocellulose-dispersion concentrate further comprises an elastomer, such as a natural rubber or synthetic rubber. The concentration of elastomer in the nanocellulose-dispersion concentrate may be from about 0.1 wt % to about 80 wt %, such as about 0.2, 0.3, 0.4, 0.5, 1, 2, 3, 4, 5, 10, 15, 20, 25, 30, 35, 40, 45, 50, 55, 60, 65, 70, or 75 wt %.

The nanocellulose-dispersion concentrate may contain additives or other components besides nanocellulose, water, the dispersion/drying agent, and solvents. For example, additives may include compatibilizers, plasticizers, antioxidants, colorants, flame retardants, nucleating agents, viscosity modifiers, density modifiers, pesticides, herbicides, bacterial disinfectants, virus inactivation agents, and so on. Such additives may be added to the nanocellulose-dispersion concentrate after it is produced, or may be introduced to the process upstream of the twin-screw extruder, such as in the nanocellulose slurry feed sub-system, for example.

The nanocellulose-dispersion concentrate is a composition containing nanocellulose that is preferably redispersable in a matrix of interest (e.g., a polymer). The redispersability of the nanocellulose-dispersion concentrate may be tested or shown in other systems, such as water, propanol, or other liquids or solids that are not necessarily polymers.

In certain embodiments, the nanocellulose-dispersion concentrate or dewatered nanocellulose is redispersed in an aqueous solution. In a typical example of such embodiments, water is removed from the starting nanocellulose slurry for purposes of shipping the nanocellulose (to avoid shipping water weight), and different water is added back at a location of use. Preferably, the nanocellulose is readily dispersible in water, to form a nanocellulose slurry without the need for homogenizing or other mechanical refining (other than standard industrial mixing). For example, a nanocellulose-dispersion concentrate powder may come apart very easily in water to individual nanoparticles with tank agitation, such as for 30 minutes.

The nanocellulose-dispersion concentrate or dewatered nanocellulose may be recovered from the twin-screw extruder and optionally packaged. The packaging may be small containers, tubes, vials, jars, bags, supersacks, or buckets, for example. In certain embodiments, the nanocellulose-dispersion concentrate is stored in powder form, such as a dry powder. In some embodiments, the nanocellulose-dispersion concentrate is part of a kit that includes packaged nanocellulose-dispersion concentrate along with use instructions that are tailored for a specific composite system.

The dispersion/drying agent, when employed in preferred embodiments, is selected based on compatibility with the selected nanocellulose and preferably compatibility with the end-use product. In some embodiments, a dispersion/drying agent contains chemical component(s) and/or functional group(s) that are capable of hydrogen bonding with polar groups present in nanocellulose. Nanocellulose polar groups include at least —OH and, to some extent, include —O—; other polar groups may be present if functionalized nanocellulose is utilized. In other embodiments, a dispersion/drying agent is not necessarily capable of hydrogen bonding with polar groups present in nanocellulose. In these or other embodiments, the dispersion/drying agent contains components that act as particle spacers. The particle spacers not only physically partition the nanocellulose particles, but also do not repel the nanocellulose phase. This is important, because repelling nanocellulose causes the nanocellulose to associate and agglomerate with itself, which leads to irreversible bonding during drying. Rather, the particle spacers within the dispersion/drying agent prevent the nanocellulose from associating in this way, thereby reducing or preventing irreversible agglomeration.

The dispersion/drying agent may also be selected based on economics (cost or availability), ability to manufacture it as a co-product on site, or for its environmental sustainability. In some embodiments, the dispersion/drying agent is bio-based, biodegradable, and/or compostable.

In some embodiments, the dispersion/drying agent is a functionalized polyalkylene wax that is functionalized for compatibility with the nanocellulose and optionally with the nanocellulose-polymer composite product. As used herein, a "functionalized" hydrogen-containing compound is one in which at least one hydrogen atom is replaced by a functional group. Without limitation, —H may be replaced by —OH, —COOH, =O, or other oxygen-containing functional groups. In certain embodiments, —H may be replaced by non-oxygen-containing functional groups, such as metals, halogens, nitrogen, sulfur, or groups containing these components, for example.

The functionalized polyalkylene wax may be a functionalized polyethylene wax, a functionalized polypropylene wax, a functionalized polybutylene wax, or a combination thereof. In certain embodiments, the dispersion/drying agent is a low-molecular weight oligomer or polymer of ethylene or functionalized ethylene. When functionalized ethylene is utilized, each repeat unit may have an average of about 0.1 to about 4.0 hydrogen atoms replaced by other functional groups. The number-average degree of polymerization of the ethylene or functionalized ethylene may be from 2 to 1000, such as from 5 to 500. In various embodiments, the number-average degree of polymerization of the ethylene or functionalized ethylene is, is at least, or is at most 2, 3, 4, 5, 6, 7, 8, 9, 10, 11, 12, 13, 14, 15, 25, 50, 75, 100, 150, 200, 300, 400, 500, 600, 700, 800, 900, or 1000, including all intervening ranges.

In some embodiments, the dispersion/drying agent is a copolymer of (a) one or more $C_2$-$C_4$ olefins and (b) maleic anhydride. $C_2$ olefin is ethylene, $C_3$ olefin is propylene, and $C_4$ olefin is 1-butene, 2-butene, isobutene, butadiene, or a combination thereof. The $C_2$-$C_4$ olefins may be functionalized olefins, such as functionalized ethylene. Maleic anhydride is an organic compound with the formula $C_2H_2(CO)_2O$ and is the acid anhydride of maleic acid. For purposes herein, a polymer of maleic acid, or a salt thereof, is deemed to be also a polymer of maleic anhydride. The maleic anhydride may be produced from 5-hydroxymethylfurfural, which may itself be derived from biomass (glucose dehydration), for example. The $C_2$-$C_4$ olefins may also be produced from biomass, such as via dehydration of alcohols that are produced by fermentation of sugar.

The copolymer of a $C_2$-$C_4$ olefin and maleic anhydride may be a block copolymer, an alternating copolymer, a random copolymer, or a combination thereof. In the case of the olefin being ethylene, for example, the copolymer may be poly(ethylene-alt-maleic anhydride) and/or poly(ethylene-graft-maleic anhydride). A graft copolymer is a type of copolymer in which one or more blocks of homopolymer are grafted as branches onto a main chain, meaning it is a branched copolymer with one or more side chains of a homopolymer attached to the backbone of the main chain. As such, poly(ethylene-graft-maleic anhydride) can also be considered a polymer of functionalized ethylene in which ethylene is functionalized with maleic acid or maleic anhydride. This type of copolymer may also be referred to as maleated polyethylene.

In some embodiments, the dispersion/drying agent is a copolymer of (a) one or more $C_2$-$C_4$ olefins and (b) acrylic acid. $C_2$ olefin is ethylene, $C_3$ olefin is propylene, and $C_4$ olefin is 1-butene, 2-butene, isobutene, butadiene, or a combination thereof. The $C_2$-$C_4$ olefins may be functionalized olefins, such as functionalized ethylene. Acrylic acid is an organic compound with the formula $CH_2=CHCOOH$. For purposes herein, a polymer of acrylic acid, or a salt thereof, is deemed to be also a polymer of acrylic anhydride.

The copolymer of a $C_2$-$C_4$ olefin and acrylic acid may be a block copolymer, an alternating copolymer, a random copolymer, or a combination thereof. Typically, the acrylic acid polymerizes across its double bond, similar to ethylene polymerization (e.g., in free-radical copolymerization), resulting in a copolymer that can be considered a graft copolymer or a polymer of functionalized ethylene in which ethylene is functionalized with acrylic acid.

In some embodiments, the dispersion/drying agent includes a polyol selected from ethylene glycol, polyethylene glycol, propylene glycol, polypropylene glycol, glycerol, butylene glycol, polybutylene glycol, butanediol, or a combination thereof. In some embodiments, the polyol is esterified with a fatty acid, such as stearic acid.

In certain embodiments, the dispersion/drying agent is or includes glycerol, or is dissolved in glycerol as a solvent. Glycerol has a high boiling temperature (about 290° C.), and three hydroxyl groups (one OH group per C atom). As nanocellulose is dried, glycerol can insert between nanocellulose particles by forming hydrogen bonds, which block the H-bonding formation, and resulting agglomeration, that would otherwise occur between nanocellulose particles. The high boiling temperature of glycerol is beneficial for use in dry powders. The powders may be dispersed in a hydrophobic polymer matrix such as polylactide (PLA). The glycerol between nanocellulose particles may function as a plasticizer as PLA is extrusion-processed, or the glycerol may be removed by vacuum during processing, or a combination thereof.

The dispersion/drying agent may be a polar molecule that has a vapor pressure less than 1.0 bar at 100° C. and optionally a vapor pressure greater than 0.001 bar, greater than 0.01 bar, or greater than 0.1 bar at 180° C. Relatively high vapor pressures at elevated temperatures can be beneficial when it is desired to remove the dispersion/drying agent during final polymer compounding, for example. The polar additive may be a polyol, such as ethylene glycol, glycerol, butanediol, etc. In some embodiments, the polar additive contains at least 0.5 OH groups per carbon atom, such as at least 1.0 OH groups per carbon atom. The OH groups prevent irreversible bonding between nanoparticles during drying. The polar additive may be organic or inorganic.

In some embodiments, the dispersion/drying agent includes a fatty acid. A fatty acid is a carboxylic acid with a long aliphatic chain, either saturated or unsaturated. Most naturally occurring fatty acids have an unbranched chain of an even number of carbon atoms, from 4 to 28. The fatty acid herein may be selected from caprylic acid, capric acid, lauric acid, stearic acid, arachidic acid, behenic acid, lignoceric acid, cerotic acid, or a combination thereof, for example. Fatty acids that are unsaturated and/or branched may be employed.

In some embodiments, the dispersion/drying agent includes a fatty alcohol. A fatty alcohol is a long-chain alcohol that is a straight-chain primary alcohol, ranging from 4 to 26 carbon atoms. Exemplary fatty alcohols include lauryl alcohol (dodecanol), stearyl alcohol, and oleyl alcohol. Fatty alcohols may be oily liquids (for smaller carbon numbers) or waxy solids. Fatty alcohols typically have an even number of carbon atoms and a single alcohol group attached to the terminal carbon. Some are unsaturated and some are branched. Fatty alcohols that are unsaturated and/or branched may be employed. Fatty alcohols with an odd number of carbon atoms may be employed. Ethylene may be oligomerized and the oligomer subjected to hydroformylation, generating an odd-numbered aldehyde, which may subsequently be hydrogenated. For example, from 1-decene, hydroformylation gives the $C_{11}$ alcohol.

In some embodiments, the dispersion/drying agent includes a siloxane-based additive. The siloxane-based additive may include a siloxane or polysiloxane material having one or more functional groups selected from the group consisting of methyl, $C_2$-$C_{24}$ alkyl, epoxide, hydroxy, amino, carboxyl, acrylate, and combinations thereof. An exemplary siloxane-based additive is polydimethylsiloxane.

A siloxane-based additive preferably provides a hydrophobic portion and a hydrophilic portion. Typically the hydrophobic and hydrophilic portions are at opposite ends of a molecule or polymer chain. The siloxane-based additive is preferably present as an emulsion in water. In certain embodiments, the dispersion/drying agent includes an alkyl ester polydimethylsiloxane emulsion. During drying of nanocellulose with an emulsion, the nanocellulose surrounds the oil-phase drops during drying and then when the water is removed, the nanocellulose gets dragged into the oil phase. In certain embodiments, the siloxane-based additive functions as a hydrogen-bonding blocking aid during drying.

In some embodiments, the dispersion/drying agent includes starch, such as cationic starch, amphoteric starch, thermoplastic starch, or a combination thereof.

Cationic starch is positively charged, which can be desirable when nanocellulose particles have slight negative surface charges. Exemplary cationic starches include quaternary ammonium cationic starch and tertiary amino cationic starch.

Amphoteric starch is a modified starch that contains positively and negatively charged substituent groups. An exemplary amphoteric starch contains quaternary ammonium cationic groups and phosphates as anionic groups.

Thermoplastic starch is starch that has been plasticized by relatively low levels (e.g., 15-30 wt %) of molecules that are capable of hydrogen bonding with the starch hydroxyl groups. The starch plasticizers may be water, polyols (e.g., glycerol), pentaerythritol, sugar alcohols (e.g., sorbitol), poly(oxyethylene)s, poly(oxypropylene)s, non-ionic surfactants, anionic surfactants, or a combination thereof.

In some embodiments, the dispersion/drying agent includes a particulate. The particulate may be selected from, but is not limited to, clay, nano-clay, talc, wollastonite, calcium carbonate (e.g., precipitated calcium carbonate), silica, mica, kaolin, nickel, glass fibers, bentonite, biotite, illite, kaolin, vermiculite, zeolite, carbon fibers, carbon nanotubes, graphene, or a combination thereof. In some embodiments, the particulate has a surface charge, which is preferably a positive charge. Known surface treatments may be used to provide a surface charge on the particulate, such as an acidic solution treatment at low pH. Other surface treatments for particulates may be done, such as silylation to improve interfacial adhesion.

In certain embodiments, the dispersion/drying agent includes at least one fatty acid and at least one particulate. The fatty acid and particulate may be present in non-reacted form or may be reacted with each other in the dispersion/drying agent. In these embodiments, the dispersion/drying agent may include (a) a fatty acid selected from caprylic acid, capric acid, lauric acid, stearic acid, arachidic acid, behenic acid, lignoceric acid, cerotic acid, or a combination thereof, and (b) clay, nano-clay, talc, wollastonite, calcium carbonate, silica, mica, kaolin, limonite, glass fibers, bentonite, biotite, illite, kaolin, vermiculite, zeolite, or a combination thereof, for example. An exemplary dispersion/drying agent with both a fatty acid and a particulate includes talc and stearic acid. Another exemplary dispersion/drying agent with both a fatty acid and a particulate includes calcium carbonate and stearic acid.

In various embodiments, the dispersion/drying agent includes an ionomer in association with a metal cation, such as calcium or zinc, forming a neutral salt. In various embodiments, the dispersion/drying agent includes a component with a positive charge (such as a surface-charged particulate or cationic starch) in association with an anion, forming a neutral salt.

The dispersion/drying agent, when present, should be selected based on the nature of the nanocellulose to be dispersed and dried. In particular, the hydrophilicity of the nanocellulose will dictate, at least in part, the suitable dispersion/drying agents. The composition, particle size, melting point, and other factors may also be considered in selecting suitable dispersion/drying agents.

A hydrophilic molecule or portion of a molecule is one whose interactions with water and other polar substances are more thermodynamically favorable than their interactions with oil or other hydrophobic solvents. Hydrophilic molecules are typically charge-polarized and capable of hydrogen bonding. Hydrophobic molecules, on the other hand, are not attracted to water or other polar molecules. Nanocellulose is typically highly hydrophilic, but not always. In some embodiments, for example, lignin-containing nanocellulose is relatively hydrophobic. Even in lignin-containing nanocellulose, there will usually still be some hydrophilic character since lignin itself is not purely hydrophobic.

In preferred embodiments, the hydrophilicity of the dispersion/drying agent (or a portion of the agent) is selected to match, or be similar to, the hydrophilicity of the nanocellulose, so that they phase-associate and the dispersion/drying agent spaces apart regions of nanocellulose.

In some embodiments, the hydrophilicity of the dispersion/drying agent is also selected based on, at least in part, the hydrophilicity of the polymer or other matrix material in the final composite, i.e. end-use application. The dispersion/drying agent may be designed to have both hydrophilic and hydrophobic components, such as at the two ends of the molecules. In such embodiments, for example, the hydrophilic end attaches to the nanocellulose surface while the hydrophobic end grabs onto a hydrophobic polymer during compounding.

In some embodiments, the dispersion/drying agent is selected based on its melting point. In these embodiments, the dispersion/drying agent melts, at least partially, during drying of the nanocellulose-dispersion concentrate. As the dried nanocellulose-dispersion concentrate is cooled, the dispersion/drying agent returns to a solid phase in which nanocellulose is evenly dispersed. As one example, polyethylene waxes (including functionalized variants) have melting points approximately in the range of 100–150° C. At least a portion of the twin-screw system should be operated at or above the melting point of the selected dispersion/drying agent.

The dispersion/drying agent may have other functions besides enhancing dispersion of nanocellulose. For example, in some embodiments, the dispersion/drying agent may function as a compatibilizer (between matrix material and nanocellulose), a plasticizer, a density modifier, a viscosity modifier, or a toughness modifier. The dispersion/drying agent may also provide ancillary attributes, such as color or texture, to the final material.

In some variations, a technical scheme is provided with the following steps (see also the flowchart of FIG. 2). First, a nanocellulose slurry is provided. Second, a dispersion/drying agent is selected based on the selected nanocellulose material, such that the dispersion/drying agent is compatible with the nanocellulose and preferably with the final composite material. Third, optionally, the nanocellulose slurry is pre-concentrated using a centrifuge or filtration device. Fourth, a nanocellulose-dispersion concentrate is made by combining the dispersion/drying agent and the nanocellulose, and optionally other components, and conveying the material through a twin-screw system with water release out of one or more system vents. Fifth, optionally, the nanocellulose-dispersion concentrate may be milled to produce a dry powder (e.g., less than 10 wt % water). Sixth, optionally, the nanocellulose-dispersion concentrate may be employed in an end-use application, such as to fabricate a composition product containing the nanocellulose and a matrix material, such as a polymer. The nanocellulose may improve some property of the matrix material (e.g., mechanical strength, viscosity, etc.) or may provide renewable content to the material.

Some variations provide a process to produce a nanocellulose-dispersion concentrate, the process comprising:
  providing a nanocellulose slurry comprising nanocellulose and water;
  selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;
  optionally pre-concentrating the nanocellulose slurry, to remove a first portion of water;
  using a twin-screw system, mixing the nanocellulose slurry and the dispersion/drying agent, and removing at least a second portion of water (or a first portion if the pre-concentration step is omitted), to generate a nanocellulose-dispersion concentrate;

optionally milling the nanocellulose-dispersion concentrate to generate a powder; and recovering the nanocellulose-dispersion concentrate in solid form or liquid form.

The water in the nanocellulose slurry may be replaced by another polar solvent, at least in part. Typically nanocellulose is made in aqueous solution, but that is not strictly necessary. The biomass fractionation procedure to make nanocellulose may in principle use a polar solvent, such as glycerol or ethanol, in place of water or in addition to water. Thus while most of this disclosure refers to water as the primary or only polar solvent in the starting nanocellulose slurry, it will be understood that one or more polar solvents other than water may be utilized.

In some variations, a process to produce a nanocellulose-dispersion concentrate comprises:

providing a nanocellulose slurry comprising nanocellulose and water;

selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose slurry and the dispersion/drying agent, to generate a mixture;

using mechanical separation, pre-concentrating the mixture and/or pre-concentrating the nanocellulose slurry prior to mixing it with the dispersion/drying agent;

using a twin-screw system, removing at least a portion of the water, to generate a nanocellulose-dispersion concentrate;

optionally milling the nanocellulose-dispersion concentrate to generate a powder; and recovering the nanocellulose-dispersion concentrate in solid form or liquid form.

All processes disclosed herein may be done in batch, continuously, or semi-continuously. The feed throughout may vary widely, including lab scale, pilot scale, semi-works scale, and commercial scale.

In various embodiments, the nanocellulose-dispersion concentrate may contain water at a moisture concentration of about, or at most about, 70 wt %, 60 wt %, 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, 2.5 wt %, 2 wt %, 1.5 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, 0.05 wt %, 0.01 wt %, or 0 wt %, including any intervening ranges (e.g., about 0.5-1.5 wt % water or about 0.1-7 wt % water).

Nanocellulose may be characterized by the unbound and bound moisture. This ratio is generally different for lignin-containing nanocellulose, compared to non-lignin-containing nanocellulose, all other factors being the same. Accordingly, the configuration of the equipment and operating parameters may be adapted to the ratio of unbound to bound moisture in the system feed. In some embodiments, a pre-concentration step (e.g., via filtration or centrifugation) targets removal of unbound water while the twin-screw system is able to remove bound water due to high shear forces in conjunction with thermal energy.

The present invention accommodates a wide variety of nanocellulose materials. Nanocellulose can be produced by breaking down biomass to sub-micron cellulose nanofibrils or nanocrystals using chemical means, mechanical means, or a combination of chemical and mechanical means. Other methods for providing nanocellulose, such as bacterial nanocellulose and tunicate-derived nanocellulose, are also available.

Typically, the production of nanocellulose occurs in two primary stages. The first stage is a purification of biomass to remove most of the non-cellulose components in the biomass such as lignin, hemicelluloses, extractives, and inorganic contaminants. This stage is typically performed by conventional pulping and bleaching. For production of cellulose nanofibrils, the second stage typically entails mechanical refining of the purified biomass fibers, with or without chemical or enzymatic treatment to lower the amount of mechanical energy required. For cellulose nanocrystals, the second stage typically entails acidic hydrolysis of the purified fibers, followed by high-shear mechanical treatment.

The nanocellulose may be obtained from fractionation of lignocellulosic biomass in the presence of an acid catalyst, a solvent for lignin, and water, to generate cellulose-rich solids, following by mechanical treatment of the cellulose-rich solids to generate the nanocellulose or a precursor thereof. In some embodiments, the solvent for lignin is an aliphatic alcohol (e.g., ethanol) and the acid catalyst is a sulfur-containing compound selected from the group consisting of sulfur dioxide, sulfurous acid, sulfur trioxide, sulfuric acid, elemental sulfur, sulfonic acids, lignosulfonic acids, and combinations thereof.

The nanocellulose may be obtained from an AVAP® lignocellulosic biomass fractionation process. It has been found that very high crystallinity can be produced and maintained during formation of nanofibers or nanocrystals, without the need for an enzymatic or separate acid treatment step to hydrolyze amorphous cellulose. High crystallinity can translate to mechanically strong fibers or good physical reinforcing properties, which are advantageous for composites, reinforced polymers, and high-strength spun fibers and textiles, for example.

In some embodiments, the nanocellulose includes hydrophobic nanocellulose. In these or other embodiments, the nanocellulose includes hydrophilic nanocellulose. In certain embodiments, the nanocellulose includes lignin-containing cellulose nanocrystals (e.g., lignin-coated cellulose nanocrystals) and/or lignin-containing cellulose nanofibrils (e.g., lignin-coated cellulose nanofibrils).

In some embodiments, the nanocellulose material is at least partially hydrophobic via deposition of at least some of the lignin onto a surface of the cellulose-rich solids (nanocellulose precursor). In these or other embodiments, the nanocellulose material is at least partially hydrophobic via deposition of at least some of the lignin onto a surface of the nanocellulose material following mechanical refining.

In some embodiments, the acid is $SO_2$ at a concentration from about 5 wt % to about 30 wt %. In some embodiments, the fractionation temperature is from about 130° C. to about 180° C. In some embodiments, the fractionation time is from about 15 minutes to about 4 hours. The process may be controlled such that a portion of the solubilized lignin intentionally is deposited back onto surfaces of the cellulose-rich solids, thereby rendering the cellulose-rich solids at least partially hydrophobic.

Process conditions may be employed which tend to promote lignin deposition onto fibers, such as extended time and/or temperature, or reduced concentration of solvent for lignin. Alternatively, or additionally, one or more washing steps may be are adapted to deposit at least some of the lignin that was solubilized during the initial fractionation. One approach is to wash with water rather than a solution of water and solvent. Because lignin is generally not soluble in water, it will begin to precipitate. Optionally, other conditions may be varied, such as pH and temperature, during fractionation, washing, or other steps, to optimize the amount of lignin deposited on surfaces. Optionally, a process for producing a hydrophobic nanocellulose material may further include chemically modifying the lignin to increase hydrophobicity of the nanocellulose material.

Alternatively, or additionally, the nanocellulose may be obtained from fractionation of lignocellulosic biomass in the presence of steam or hot water, optionally with a fractionation catalyst (e.g., acetic acid), to obtain cellulose-rich solids, followed by mechanical refining of the cellulose-rich solids to generate nanocellulose. These steps may collectively be referred to as hydrothermal-mechanical treatment. The reaction solution for fractionation may consist essentially of the steam or hot water. Note that "steam or hot water" refers to water that will be in one or more phases dictated by thermodynamics at the given temperature and pressure. The temperature for the fractionation may be from about 120° C. to about 220° C., such as about 150-200° C. The water may be in the form of steam, superheated steam, supersaturated steam, or pressurized liquid water. In some embodiments, the fractionation step is carried out with a residence time from about 1 minute to about 60 minutes, such as about 2, 2.5, 3, 3.5, 4, 5, 7.5, 10, 12.5, 15, 20, 25, 30, 35, 40, 45, 50, or 55 minutes.

In embodiments employing hydrothermal-mechanical treatment, the cellulose-rich solids usually contain a significant concentration of lignin. Therefore, these embodiments can be beneficial when hydrophobic nanocellulose is desired. The hydrothermal-mechanical treatment may generate a nanocellulose that can be referred to as nanolignocellulose due to high lignin content. The nanolignocellulose may contain, on a bone-dry, ash-free, and acetyl-free basis, from about 35 wt % to about 80 wt % cellulose nanofibrils, cellulose microfibrils, or a combination thereof, from about 15 wt % to about 45 wt % lignin, and from about 5 wt % to about 20 wt % hemicelluloses. Of the lignin present, some may coat nanocellulose particles, while the remainder of the lignin is internal to the nanocellulose particles.

Nanocellulose is preferably obtained from lignocellulosic biomass. As used herein, "lignocellulosic biomass" means any material containing cellulose and lignin. Lignocellulosic biomass may also contain hemicellulose. Mixtures of one or more types of biomass can be used. In some embodiments, the biomass feedstock comprises both a lignocellulosic component (such as one described above) in addition to a sucrose-containing component (e.g., sugarcane or energy cane) and/or a starch component (e.g., corn, wheat, rice, etc.). Various moisture levels may be associated with the starting biomass. The biomass feedstock need not be, but may be, relatively dry. In general, the biomass is in the form of a particulate or chip, but starting biomass particle size is not critical.

The biomass feedstock for making nanocellulose may be selected from hardwoods, softwoods, forest residues, eucalyptus, industrial wastes, pulp and paper wastes, consumer wastes, or combinations thereof. Some embodiments utilize agricultural residues, which include lignocellulosic biomass associated with food crops, annual grasses, energy crops, or other annually renewable feedstocks. Exemplary agricultural residues include, but are not limited to, corn stover, corn fiber, wheat straw, sugarcane bagasse, sugarcane straw, rice straw, oat straw, barley straw, miscanthus, energy cane straw/residue, or combinations thereof.

Other sources of nanocellulose include bacterial nanocellulose, nanocellulose from tunicates, treatment of pulp with sulfuric acid, treatment of pulp with 2,2,6,6-tetramethylpiperidine-1-oxy radical (TEMPO), or treatment of pulp with cellulase enzymes. In some embodiments, the nanocellulose employed herein is not bacterial nanocellulose, is not derived from tunicates, is not obtained from sulfuric acid hydrolysis, is not obtained from TEMPO, and/or is not obtained via enzymatic hydrolysis of lignocellulosic biomass or cellulose.

As intended herein, "nanocellulose" is broadly defined to include a range of cellulosic materials, including but not limited to microfibrillated cellulose, nanofibrillated cellulose, microcrystalline cellulose, nanocrystalline cellulose, and particulated or fibrillated dissolving pulp. In certain embodiments, the nanocellulose includes particles having at least one length dimension (e.g., diameter) on the nanometer scale. In some embodiments, the nanocellulose has particles with all average dimensions greater than 1 micron, such as for certain microfibrillated celluloses.

"Nanofibrillated cellulose" or equivalently "cellulose nanofibrils" means cellulose fibers or regions that contain nanofibrils or both micron-sized and nanometer-sized particles or fibers. "Nanocrystalline cellulose" or equivalently "cellulose nanocrystals" means cellulose particles, regions, or crystals that contain nanometer-sized domains, or both micron-sized and nanometer-sized domains. "Micron-sized" includes from 1 µm to 100 µm and "nanometer-sized" includes from 0.01 nm to 1000 nm (1 µm). Larger domains (including long fibers) may also be present in any of these materials.

The particular size and shape of the nanocellulose can range from nanometer scale up to micron scale, in width and/or length. Cellulose nanofibers typically have dimensions of 5-20 nm in width and 500-5000 nm in length and contain both amorphous and crystalline domains of cellulose. Cellulose nanocrystals typically have a width of 3-8 nm and a length of 100-500 nm and are predominantly crystalline. While these ranges and dimensions are typical, this invention encompasses all nanocellulose materials, regardless of particle shapes or particle dimensions.

Some embodiments employ a blend of nanocellulose crystals and fibrils. A blend of nanocellulose crystals and fibrils may contain from 1% to 99% nanocellulose crystals and from 99% to 1% of nanocellulose fibrils, respectively. In various embodiments, the blend of nanocellulose crystals and fibrils contains 2%, 5%, 10%, 15%, 20%, 25%, 30%, 35%, 40%, 45%, 50%, 55%, 60%, 65%, 70%, 75%, 80%, 85%, 90%, 95%, or 98% (all weight percentages) of nanocellulose crystals, with the rest of the nanocellulose being nanocellulose fibrils.

Some embodiments employ a blend of cellulose nanofibrils and microfibrils. A blend of cellulose nanofibrils and cellulose microfibrils may contain from 1% to 99% cellulose nanofibrils and from 99% to 1% of cellulose microfibrils, respectively. In various embodiments, the blend of cellulose nanofibrils and microfibrils contains 2%, 5%, 10%, 15%, 20%, 25%, 30%, 35%, 40%, 45%, 50%, 55%, 60%, 65%, 70%, 75%, 80%, 85%, 90%, 95%, or 98% (all weight percentages) of cellulose nanofibrils, with the rest being cellulose microfibrils.

One characteristic of a nanocellulose blend is the wide range of particles sizes present, since nanocellulose fibrils are much larger than nanocellulose crystals. The nanocellulose crystal width may vary from about 2 nanometers to about 10 nanometers, or from about 3 nanometers to about 6 nanometers, for example. The nanocellulose crystal length may vary from about 50 nanometers to about 500 nanometers, or from about 100 nanometers to about 350 nanometers, for example. The nanocellulose fibril width may vary from about 5 nanometers to about 100 nanometers, or from about 10 nanometers to about 50 nanometers, for example. The nanocellulose fibril length may vary from about 200 nanometers to about 10 microns, or from about 400 nanometers to about 3 microns, for example. The average nanocellulose particle width in the blend may vary from about 3 nanometers to about 50 nanometers, such as from about 5 nanometers to about 30 nanometers. The average nanocellulose particle length in the blend may vary from about 50 nanometers to about 5 microns, such as from about 100 nanometers to about 2 microns.

In some variations, nanocellulose is obtained from a process that comprises:
  (a) providing a lignocellulosic biomass feedstock;
  (b) fractionating the feedstock in the presence of an acid, a solvent for lignin, and water, to generate cellulose-rich solids and a liquid containing hemicellulose and lignin;
  (c) mechanically treating the cellulose-rich solids to form cellulose fibrils and/or cellulose crystals, thereby generating a nanocellulose material having a crystallinity (i.e., cellulose crystallinity) of at least 60%; and
  (d) recovering the nanocellulose material.

In some embodiments, the acid is selected from the group consisting of sulfur dioxide, sulfurous acid, sulfur trioxide, sulfuric acid, lignosulfonic acid, and combinations thereof. In particular embodiments, the acid is sulfur dioxide.

In some embodiments, during step (c), the cellulose-rich solids are treated with a total mechanical energy of less than about 5000 kilowatt-hours per ton of the cellulose-rich solids, such as less than about 4000, 3000, 2000, or 1000 kilowatt-hours per ton of the cellulose-rich solids. Energy consumption may be measured in any other suitable units. An ammeter measuring current drawn by a motor driving the mechanical treatment device is one way to obtain an estimate of the total mechanical energy.

Mechanically treating in step (c) may employ one or more known techniques such as, but by no means limited to, milling, grinding, beating, sonicating, or any other means to form or release nanofibrils and/or nanocrystals in the cellulose. Essentially, any type of mill or device that physically separates fibers may be utilized. Such mills are well-known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. See, for example, Smook, *Handbook for Pulp & Paper Technologists*, Tappi Press, 1992; and Hubbe et al., "Cellulose Nanocomposites: A Review," *BioResources* 3(3), pages 929-980 (2008).

The extent of mechanical treatment may be monitored during the process by any of several means. Certain optical instruments can provide continuous data relating to the fiber length distributions and % fines, either of which may be used to define endpoints for the mechanical treatment step. The time, temperature, and pressure may vary during mechanical treatment. For example, in some embodiments, sonication for a time from about 5 minutes to 2 hours, at ambient temperature and pressure, may be utilized.

In some embodiments, a portion of the cellulose-rich solids is converted to nanofibrils while the remainder of the cellulose-rich solids is not fibrillated. In various embodiments, about 10%, 20%, 30%, 40%, 50%, 60%, 70%, 80%, 90%, 95%, 99%, or substantially all of the cellulose-rich solids are fibrillated into nanofibrils.

In some embodiments, a portion of the nanofibrils is converted to nanocrystals while the remainder of the nanofibrils is not converted to nanocrystals. In various embodiments, about 10%, 20%, 30%, 40%, 50%, 60%, 70%, 80%, 90%, 95%, 99%, or substantially all of the nanofibrils are converted to nanocrystals. During drying, it is possible for a small amount of nanocrystals to come back together and form nanofibrils.

Following mechanical treatment, the nanocellulose material may be classified by particle size. A portion of material may be subjected to a separate process, such as enzymatic hydrolysis to produce glucose. Such material may have good crystallinity, for example, but may not have desirable particle size or degree of polymerization.

Step (c) may further comprise treatment of the cellulose-rich solids with one or more enzymes or with one or more acids. When acids are employed, they may be selected from the group consisting of sulfur dioxide, sulfurous acid, lignosulfonic acid, acetic acid, formic acid, and combinations thereof. Acids associated with hemicellulose, such as acetic acid or uronic acids, may be employed, alone or in conjunction with other acids. Also, step (c) may include treatment of the cellulose-rich solids with heat. In some embodiments, step (c) does not employ any enzymes or acids.

In step (c), when an acid is employed, the acid may be a strong acid such as sulfuric acid, nitric acid, or phosphoric acid, for example. Weaker acids may be employed, under more severe temperature and/or time. Enzymes that hydrolyze cellulose (i.e., cellulases) and possibly hemicellulose (i.e., with hemicellulase activity) may be employed in step (c), either instead of acids, or potentially in a sequential configuration before or after acidic hydrolysis.

In some embodiments, the process comprises enzymatically treating the cellulose-rich solids to hydrolyze amorphous cellulose. In other embodiments, or sequentially prior to or after enzymatic treatment, the process may comprise acid-treating the cellulose-rich solids to hydrolyze amorphous cellulose.

In some embodiments, the process further comprises enzymatically treating the nanocrystalline cellulose. In other embodiments, or sequentially prior to or after enzymatic treatment, the process further comprises acid-treating treating the nanocrystalline cellulose.

If desired, an enzymatic treatment may be employed prior to, or possibly simultaneously with, the mechanical treatment. However, in preferred embodiments, no enzyme treatment is necessary to hydrolyze amorphous cellulose or weaken the structure of the fiber walls before isolation of nanofibers.

Following mechanical treatment, the nanocellulose may be recovered. Separation of cellulose nanofibrils and/or nanocrystals may be accomplished using apparatus capable of disintegrating the ultrastructure of the cell wall while preserving the integrity of the nanofibrils. For example, a homogenizer may be employed. In some embodiments, cellulose aggregate fibrils are recovered, having component fibrils in a range of 1-100 nm width, wherein the fibrils have not been completely separated from each other.

The process may further comprise bleaching the cellulose-rich solids prior to step (c) and/or as part of step (c). Alternatively, or additionally, the process may further comprise bleaching the nanocellulose material during step (c)

and/or following step (c). Any known bleaching technology or sequence may be employed, including enzymatic bleaching.

Optionally, the process further comprises hydrolyzing amorphous cellulose into glucose in step (b) and/or step (c), recovering the glucose, and fermenting the glucose to a fermentation product. Optionally, the process further comprises recovering, fermenting, or further treating hemicellulosic sugars derived from the hemicellulose. Optionally, the process further comprises recovering, combusting, or further treating the lignin.

The nanocellulose material may include, or consist essentially of, nanofibrillated cellulose. The nanocellulose material may include, or consist essentially of, nanocrystalline cellulose. In some embodiments, the nanocellulose material may include, or consist essentially of, nanofibrillated cellulose and nanocrystalline cellulose.

In some embodiments, the crystallinity of the cellulose-rich solids (i.e., the nanocellulose precursor material) is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. In these or other embodiments, the crystallinity of the nanocellulose material is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. The crystallinity may be measured using any known techniques. For example, X-ray diffraction and solid-state $^{13}C$ nuclear magnetic resonance may be utilized.

In some embodiments, the nanocellulose material is characterized by an average degree of polymerization from about 100 to about 3000, such as about 125, 150, 175, 200, 225, 250, 300, 400, 500, 600, 700, 800, 900, 1000, 1100, 1200, 1300, 1400, 1500, 2000, 2500, or 2600. For example, the nanocellulose material may be characterized by an average degree of polymerization from about 300 to about 700, or from about 150 to about 250. The nanocellulose material, when in the form of nanocrystals, may have a degree of polymerization less than 100, such as about 75, 50, 25, or 10. Portions of the material may have a degree of polymerization that is higher than 3000, 4000, or 5000.

In some embodiments, the nanocellulose material is characterized by a degree of polymerization distribution having a single peak. In other embodiments, the nanocellulose material is characterized by a degree of polymerization distribution having two peaks, such as one centered in the range of 150-250 and another peak centered in the range of 300-700.

In some embodiments, the nanocellulose material is characterized by an average length-to-width aspect ratio of particles from about 10 to about 1000, such as about 15, 20, 25, 35, 50, 75, 100, 150, 200, 250, 300, 400, or 500. Nanofibrils are generally associated with higher aspect ratios than nanocrystals. Nanocrystals, for example, may have a length range of about 100 nm to 500 nm and a diameter of about 4 nm, translating to an aspect ratio of 25 to 125. Nanofibrils may have a length of about 2000 nm and diameter range of 5 to 50 nm, translating to an aspect ratio of 40 to 400. In some embodiments, the aspect ratio is less than 50, less than 45, less than 40, less than 35, less than 30, less than 25, less than 20, less than 15, or less than 10.

In some embodiments, the nanocellulose contains less than 0.05 wt % sulfur, such as about 0.02 wt % sulfur or less, including no detectible sulfur. In some embodiments, the nanocellulose contains no sulfate half-ester groups attached to the surface of the nanocellulose particles, as these groups may reduce the thermal stability of the nanocellulose.

The "thermal-decomposition onset temperature" of a material is defined by a thermal gravimetric analysis of the material. Thermal gravimetric analysis, also known as thermogravimetric analysis (TGA), is a technique in which the mass of a substance is monitored as a function of temperature or time as the sample specimen is subjected to a controlled temperature program in a controlled atmosphere. The thermal gravimetric analysis may utilize a PerkinElmer STA6000 Simultaneous Thermal Analyzer (London, UK). The abscissa (x-axis) is temperature and the ordinate (y-axis) is weight percent (%). A descending TGA thermal curve indicates a weight loss occurred. From the TGA thermal curve, the extrapolated onset temperature can be calculated, denoting the temperature at which the weight loss begins. The extrapolated onset temperature is a reproducible temperature calculation and it is specified to be used by ASTM and ISO for TGA. The extrapolated onset is the point of intersection of the tangent drawn at the point of greatest slope on the leading edge of the peak with the extrapolated base line. This technique may be applied to the nanocellulose or the dispersion/drying agent.

For purposes of this specification, to determine the thermal-decomposition onset temperature of nanocellulose, samples are heated from 50° C. to 600° C. at a heating rate of 10° C./min under nitrogen atmosphere with a flow rate of 40 mL/min, using a PerkinElmer STA6000 Simultaneous Thermal Analyzer. The mass is measured as a function of temperature. Mass loss, other than water loss, indicates thermal decomposition of the material. The extrapolated onset temperature from the TGA graph is the estimated thermal-decomposition onset temperature of the nanocellulose or the dispersion/drying agent.

In some preferred embodiments, the nanocellulose is characterized by a thermal-decomposition onset temperature of about, or at least about, 300° C., 310° C., 320° C., or 330° C., such as in the case of BioPlus® cellulose nanocrystals or nanofibrils generated from fractionation with an acid catalyst, a solvent for lignin, and water. In other embodiments, the nanocellulose is characterized by a thermal-decomposition onset temperature of about 220° C. to about 300° C., such as about 225° C. in the case of cellulose nanofibrils generated from TEMPO or about 285° C. in the case of cellulose nanocrystals generated from sulfuric acid.

Optionally, the nanocellulose itself is functionalized with one or more surface functional groups, to generate nanocellulose derivatives. Such functionalization may be done to improve compatibility with the matrix polymer, for example, or to impart special properties to the nanocellulose. Because nanocellulose has high surface area and high concentration of surface hydroxyl groups, targeted surface modification may introduce virtually any desired surface functionality.

For example, nanocellulose derivatives may be selected from the group consisting of nanocellulose esters, nanocellulose ethers, nanocellulose ether esters, alkylated nanocellulose compounds, cross-linked nanocellulose compounds, acid-functionalized nanocellulose compounds, base-functionalized nanocellulose compounds, and combinations thereof. Various types of nanocellulose functionalization or derivatization may be employed, such as functionalization using polymers, chemical surface modification, functionalization using nanoparticles (i.e. other nanoparticles besides the nanocellulose), modification with inorganics or surfactants, or biochemical modification.

The dewatered nanocellulose may be used in a wide range of end-use applications. In many embodiments, the nanocellulose is incorporated into a matrix material to form a nanocellulose-containing composite material. Nanocellulose may be compounded to make a composite material using a variety of apparatus, such as (but not limited to) single-screw extruders, twin-screw extruders, injection-molding lines, compression-molding lines, kneaders, calenders, rotor-stator dispersion mills, high-shear mixers, agitated tanks, or in-line mixers.

The matrix material may be a matrix polymer. For example, the matrix polymer may be selected from the group consisting of polyolefins, polyols, polyesters, polyamides, polylactide, polystyrene, polycarbonates, polyacrylates, polystyrenes, styrenic rubbers, natural rubbers, synthetic rubbers, polyurethanes, polyureas, poly(amide-enamine)s, polyanhydrides, polyhydroxyalkanoates, poly(alkene dicarboxylate)s, silicones, thermoplastics elastomers, thermoplastic polyurethanes (TPU), synthetic rubber, natural rubber, carbonaceous polymers, and combinations or co-polymers thereof.

Alternatively, or additionally, the matrix material may be a material other than a polymer, such as a material selected from the group consisting of paper, paperboard, fiber and wood composites (e.g., particleboard and molded pulp products), emulsions, hydrogels, carbon, organic solids, inorganic solids, oils, organic liquids, inorganic liquids, cementitious materials (e.g., concrete or cement), minerals, ceramics, metals, metal alloys, glass, and combinations thereof. A non-polymer matrix material may be an adhesive matrix, a battery electrode matrix, a bioink matrix, or an electronic ink matrix, for example.

In some embodiments, the matrix material includes a polymer selected from polyesters, polyolefins, polyamides, polystyrenes, styrenic rubbers, natural rubbers, synthetic rubbers, polyurethanes, polyureas, poly(amide-enamine)s, polyanhydrides, polyacrylates, polyhydroxyalkanoates, poly(alkene dicarboxylate)s, silicones, thermoplastics elastomers, thermoplastic polyurethane (TPU), synthetic rubber, natural rubber, or combinations or copolymers thereof. Some polymer blends include polylactide, polyhydroxyalkanoates, aliphatic-aromatic copolyesters, both polylactide and aliphatic-aromatic copolyesters, polyethylene and/or polypropylene.

In various embodiments, a polymer is selected from the group consisting of polyethylene, polypropylene, polybutene, polyisobutylene, polybutadiene, polyisoprene, poly(ethylene-co-acrylic acid), poly(lactic acid) (or polylactide), poly(glycolic acid) (or polyglycolide), poly(hydroxybutyrate), poly(butylene adipate-co-terephtalate), poly(butylene succinate), poly(hydroxybutyrate-co-hydroxyvalerate), poly(ethylene terephthalate), polyvinyl alcohol, polystyrene, poly(butyl acrylate), poly(tert-butyl acrylate-co-ethyl acrylate-co-methacrylic acid), poly(ethyl acrylate), poly(2-ethylhexyl acrylate), poly(methyl acrylate), polyacrylonitrile, poly(acrylonitrile-co-methyl acrylate), poly(styrene-co-maleic anhydride), poly(methyl methacrylate), poly(alkyl methacrylate), polyvinylcyclohexane, poly(Bisphenol A carbonate), poly(propylene carbonate), poly(1,4-butylene adipate), poly(1,4-butylene succinate), poly(1,4-butylene terephthalate), poly(ethylene succinate), poly(vinyl acetate), poly(propylene glycol), poly(tetrahydrofuran), poly(ethyl vinyl ether), polydimethylsiloxane, nylons (aliphatic polyamides), and combinations or copolymers thereof. Carbonaceous polymers may also be incorporated in the composites. Examples of carbonaceous polymers include polyacenaphthylene, graphite, graphene, carbon fibers, and lignin.

Polymers that may be included in the composite product may be hydrophobic, partially hydrophobic, or oleophilic, for example. Hydrophilic polymers may be modified to render them at least partially hydrophobic, with suitable coatings or combinations of components (e.g., interpenetrating networks of polymers).

Polymers or copolymers may be produced by polymerizing one or more monomers selected from the group consisting of acrylics, amides, carbon, carbonates, dienes, esters, ethers, fluorocarbons, imides, olefins, organic acids (e.g., lactic acid, glycolic acid, succinic acid, hydroxypropionic acid, etc.), styrenes, siloxanes, vinyl acetals, vinyl and vinylidene chlorides, vinyl esters, vinyl ethers, vinyl ketones, vinylpyridine, vinypyrrolidone, and combinations thereof.

A polymer in a composite may comprise a thermoplastic polymer, a thermoset polymer, or a combination of these. Thermoset polymers include, but are not limited to, polyurethanes, polyesters, polyureas, polyisoprenes (including natural rubber or synthetic rubber), phenol-formaldehyde resins, polyepoxides, polyimides, polycyanurates, polyfurans, silicones, and combinations or co-polymers thereof.

In some embodiments, a matrix polymer is specifically an elastomer. Exemplary elastomers include natural rubber (e.g., natural latex non-vulcanized rubber) and synthetic rubber. Natural rubber is mainly poly-cis-isoprene. Synthetic rubber is made from various petroleum-based monomers. The most prevalent synthetic rubbers are styrene-butadiene rubbers (SBR) derived from the copolymerization of styrene and 1,3-butadiene. Other synthetic rubbers are prepared from isoprene (2-methyl-1,3-butadiene, yielding polyisoprene), chloroprene (2-chloro-1,3-butadiene), and isobutylene (methylpropene) with a small percentage of isoprene for crosslinking (making butyl rubber).

In some embodiments, a matrix polymer is bio-based, biodegradable, and/or compostable. In these or other embodiments, the carrier polymer is bio-based, biodegradable, and/or compostable. In some embodiments, the matrix polymer or carrier polymer is or includes a biodegradable polymer, such as any polymer described in Vroman and Tighzert, "Biodegradable Polymers," *Materials* 2009, 2, 307-344, which is hereby incorporated by reference herein. In some embodiments, a nanocellulose-containing composite product has at least 50%, 60%, 70%, 80%, 90%, 95%, or 100% renewable carbon content, as measurable by $^{13}C$ analysis, for example.

One or more additives may be included in a composite material, wherein the additives may be selected from the group consisting of compatibilizers, plasticizers, antioxidants, colorants, flame retardants, nucleating agents, viscosity modifiers, density modifiers, and combinations thereof. Exemplary additives include, but are by no means limited to, clay, nano-clay, talc, wollastonite, calcium carbonate, silica, mica, kaolin, nickel, glass fibers, carbon, cellulose fibers, aramid fibers, polyimide fibers, jute fibers, polyethylene fibers, polyethylene terephthalate fibers, polyamide fibers, and combinations thereof. In some embodiments, carbonaceous additives are used, such as carbon fibers, carbon nanotubes, graphene, lignin-derived carbon, or lignin.

Many types of composite products are possible, including films, coatings, packaging, utensils, fibers, fabrics, apparel, durable goods, nonwovens, and so on. The composite product may be in the form of a pellet, extruded part, injection-molded part, blow-molded part, spun fiber, layered sheet, film, foam, container, bag, engineered part, 3D-printing substrate, 3D-printed part, or a combination thereof, for example.

A nanocellulose-containing composite may be 3D-printed. Three-dimensional (3D) printing, or additive manufacturing, is a process by which an object is created in its three-dimensional form using a specialized printer. The printer receives instructions from a design file that is created in a computer with the help of a 3D modeling program. The file or the digital blueprint of the object to be printed, is then sliced into two-dimensional (2D) representations that are sent to the printer. The layers of material are built according to the information contained in the file; the layers keep on adding until the full object is printed. The process of 3D printing requires much more time and involves significant capital investments as compared to 2D printing, but offers a wide array of advantages—such as the ability, in principle, to print any geometry.

In some composite products provided herein, the product with dispersed nanocellulose has higher tensile modulus compared to the polymer alone, or compared to an otherwise-identical composite without the dispersion/drying agent and/or without the use of twin-screw system dewatering or drying.

In some composite products provided herein, the product with dispersed nanocellulose has higher tensile modulus compared to the polymer alone, or compared to an otherwise-identical composite without the dispersion/drying agent and/or without the use of twin-screw system dewatering or drying.

In some composite products provided herein, the product with dispersed nanocellulose has higher compressive modulus compared to the polymer alone, or compared to an otherwise-identical composite without the dispersion/drying agent and/or without the use of twin-screw system dewatering or drying.

In some composite products provided herein, the product with dispersed nanocellulose has higher toughness compared to the polymer alone, or compared to an otherwise-identical composite without the dispersion/drying agent and/or without the use of twin-screw system dewatering or drying.

In some composite products provided herein, the product with dispersed nanocellulose has better moisture barrier and/or oxygen barrier properties compared to the polymer alone, or compared to an otherwise-identical composite without the dispersion/drying agent and/or without the use of twin-screw system dewatering or drying.

The tensile modulus, compressive modulus toughness, and other properties of the composite product is improved due to the inherent properties of the nanocellulose particles and because those nanocellulose particles are well-dispersed in the composite, as a result of the twin-screw system dewatering or drying and the dispersion/drying agent.

The degree of dispersion of nanocellulose in the final composite may be measured or qualitatively assessed. The degree of dispersion is inverse to the degree of agglomeration. If there is perfect, uniform dispersion, then there is no particle agglomeration. This invention does not require perfect dispersion such that every single nanoparticle is isolated from every other nanoparticle.

Figure 11:
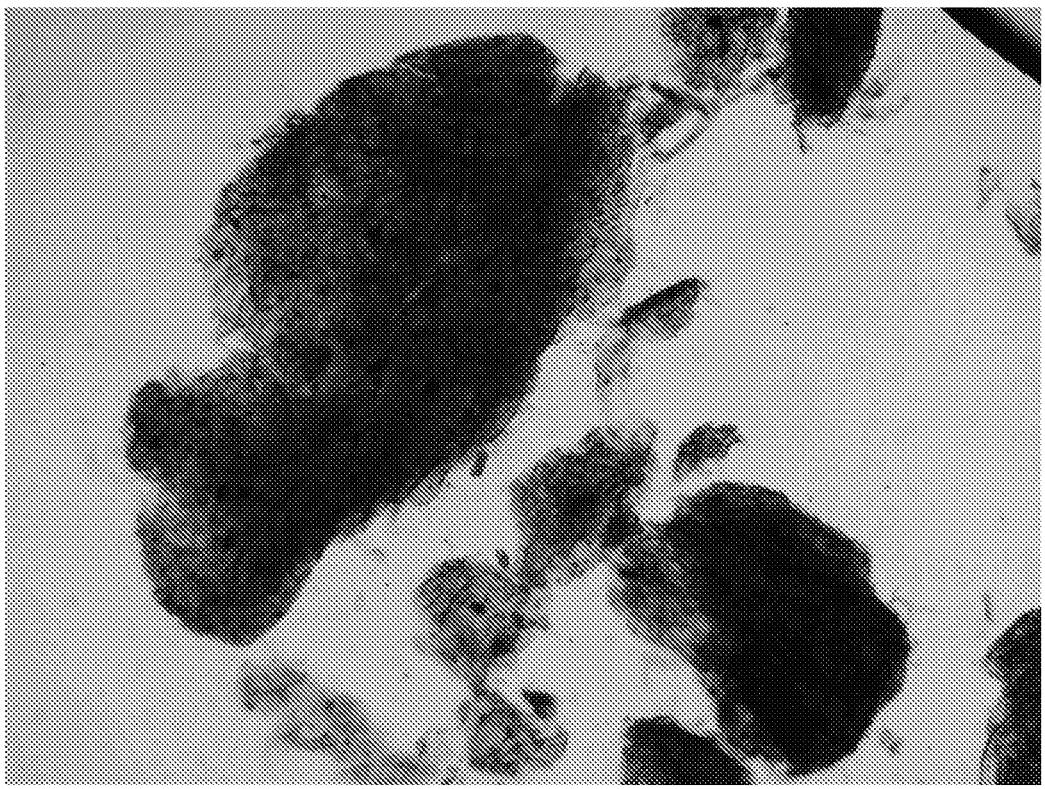
FIG. 11 is an optical micrograph (400× magnification) of the nanocellulose-containing composite of Comparative Example A using a dispersion/drying agent but with oven drying rather than with a twin-screw system, indicating poorly dispersed nanocellulose in diisononyl phthalate.

Nanocellulose dispersion may be measured or qualitatively assessed using techniques such as scanning electron microscopy, transmission electron microscopy, interferometric microscopy, confocal laser scanning microscopy, optical microscopy, small-angle X-ray scattering, atomic force microscopy, dynamic light scattering, nanotomography, or thermogravimetric analysis, for example. FIGS. 3 to 10 (see Examples 1 to 8, respectively) are optical micrographs revealing good dispersion (no agglomeration), in contrast to FIGS. 11 and 12 which is are optical micrographs showing poor dispersion (significant particle agglomeration).

Nanocellulose dispersion may also be measured or qualitatively assessed using calibration techniques in which validated polymers with known nanocellulose dispersions are tested for a relevant property. Test samples are then measured for the same property which is correlated with the degree of nanocellulose dispersion using a pre-determined graph, equation, or look-up table.

In a composite product, the dispersion/drying agent, if present, may be in the same phase as the nanocellulose, the same phase as the matrix material, and/or in a distinct phase. The dispersion/drying agent may be disposed between nanocellulose particles and matrix material. In some embodiments, the dispersion/drying agent surrounds nanocellulose particles.

In some embodiments, the nanocellulose-containing composite product is configured as a catalyst, catalyst substrate, or co-catalyst. In some embodiments, the nanocellulose-containing composite product is configured electrochemically for carrying or storing an electrical current or voltage.

In some embodiments, the nanocellulose-containing composite product is incorporated into a filter, membrane, or other separation device.

In some embodiments, the nanocellulose-containing composite product is incorporated as an additive into a coating, paint, or adhesive. In some embodiments, the nanocellulose-containing composite product is a cement additive.

A nanocellulose-containing composite product may include any of the disclosed compositions. Many composite products are possible. For example, a composite product may be selected from the group consisting of a structural object, a foam, an aerogel, a carbon composite, a film, a coating, a coating precursor, a current or voltage carrier, a filter, a membrane, a catalyst, a catalyst substrate, a coating or coating additive, a paint or paint additive, an adhesive or adhesive additive, an ink or ink additive, a cement additive, a paper coating or paper additive, a thickening agent, a rheological modifier, an additive for a drilling fluid, and combinations or derivatives thereof.

Nanocellulose-containing composite products provided herein are suitable as coating materials as they are expected to have a high oxygen barrier and affinity to wood fibers for application in food packaging and printing papers. Alternatively, or additionally, the nanocellulose-containing composite products may be incorporated into products to improve barrier properties or to improve nucleation, for example.

Nanocellulose-containing composite products provided herein are suitable as additives to improve the durability of paint, protecting paints and varnishes from attrition caused by UV radiation.

Nanocellulose-containing composite products provided herein are suitable as thickening agents in food and cosmetics products. Nanocellulose can be used as thixotropic, biodegradable, dimensionally stable thickener (stable against temperature and salt addition). Nanocellulose-polymer composite products provided herein are suitable as a Pickering stabilizer for emulsions and particle stabilized foam. The large surface area of nanocellulose in combination with its biodegradability makes it attractive materials for highly porous, mechanically stable aerogels.

In other embodiments, a nanocellulose-dispersion concentrate is incorporated into a structural object, a foam, an aerogel, a carbon composite, a film, a coating, a coating precursor, a current or voltage carrier, a filter, a membrane, a catalyst, a catalyst substrate, a coating additive, a paint additive, an adhesive additive, a cement additive, a paper coating, a thickening agent, a rheological modifier, an additive for a drilling fluid, and combinations or derivatives thereof.

Other applications suitable to the present invention include high-strength spun fibers and textiles, advanced composite materials, barrier films, paints, lacquers, adhesives, switchable optical devices, pharmaceuticals, drug delivery systems, bone replacement, tooth repair, paper, packaging, building products, additives for foods and cosmetics, and hydrogels.

Aerospace and transportation composites may benefit from the disclosed nanocellulose-dispersion concentrates. Automotive applications include nanocellulose composites with polypropylene, polyamide (e.g. Nylons), or polyesters (e.g. PBT).

The nanocellulose-dispersion concentrates provided herein are suitable as strength-enhancing additives for renewable and biodegradable composites. The dispersion/drying agent may function as a binder between two organic phases for improved fracture toughness and prevention of crack formation for application in packaging, construction materials, appliances, and renewable fibers.

The nanocellulose-dispersion concentrates provided herein are suitable as transparent and dimensional stable strength-enhancing additives for application in flexible displays, flexible circuits, printable electronics, and flexible solar panels.

The nanocellulose-dispersion concentrates provided herein are suitable for composite and cement additives allowing for crack reduction and increased toughness and strength. Foamed, cellular nanocellulose-concrete hybrid materials allow for lightweight structures with increased crack reduction and strength.

Strength enhancement with nanocellulose increases both the binding area and binding strength for application in high-strength, high-bulk, high-filler content paper and board with enhanced moisture and oxygen barrier properties. The pulp and paper industry in particular may benefit from the nanocellulose-dispersion concentrates provided herein.

In some embodiments, the nanocellulose-dispersion concentrate is incorporated as a thickening agent or rheological modifier. For example, the nanocellulose-dispersion concentrate may be an additive in a drilling or fracturing fluid, such as (but not limited to) an oil recovery fluid and/or a gas recovery fluid.

The nanocellulose-dispersion concentrate may generally be useful in any system that can benefit from incorporation of the nanocellulose-dispersion concentrate. As discussed in this specification, systems include, but are by no means limited to, polymers, oligomers, paper, paperboard, fiber and wood composites, emulsions, hydrogels, carbon, organic solids, inorganic solids, oils, organic liquids, inorganic liquids, cementitious materials (e.g., concrete or cement), minerals, ceramics, metals, metal alloys, glass, or a combination thereof. A non-polymer matrix material may be an adhesive matrix, a battery electrode matrix, a bioink matrix, or an electronic ink matrix, for example.

EXAMPLES

Example 1: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension with about 3 wt % solids. The aqueous suspension may be referred to as a nanocellulose slurry.

A dispersion/drying agent is selected to be a copolymer of ethylene and maleic anhydride, based on the lignin-coated nanofibrils and the selected matrix polymer (polypropylene). The specific dispersion/drying agent is Honeywell A-C® 573A wax (Honeywell Performance Materials and Technologies, Morris Plains, New Jersey, USA), which is an ethylene maleic anhydride copolymer in powder form. Honeywell A-C® 573A wax is a low-molecular-weight copolymer of maleic anhydride and propylene or ethylene. Functionalization of a non-polar propylene or ethylene with maleic anhydride provides the copolymers with both non-polar and polar characteristics. Maleic anhydride provides polarity without polymer degradation, according to Honeywell.

A starting nanocellulose-dispersion slurry is generated by combining under mechanical stirring 2,917 grams of the aqueous suspension of lignin-coated nanofibrils with 88 grams of the dispersion/drying agent described above, to generate a starting slurry. The starting nanocellulose-dispersion slurry initially contains about 3 wt % nanocellulose (lignin-coated nanofibrils) and about 94 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 revolutions per minute (RPM) and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry contained in the extruder. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate (which means two parts nanocellulose and two parts dispersion/drying agent) and 96 parts by weight polypropylene random copolymer (ExxonMobil, Houston, Texas, USA) are combined and mixed in a Brabender torque rheometer. The rheometer is operated at a speed of 40 RPM and a temperature of 150° C., for 11 minutes. The resulting nanocellulose-polymer composite is shown in the optical micrograph (100× magnification) of FIG. 3, indicating evenly dispersed 2 wt % nanocellulose (lignin-coated nanofibrils) in polypropylene.

Example 2: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (slurry) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell AClyn® 295A wax (Honeywell Performance Materials and Technologies, Morris Plains, New Jersey, USA), which is a zinc ionomer of an ethylene acrylic acid copolymer that is 98% neutralized with zinc (corrosion protection), in powdered form.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry contained in the extruder. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 4, indicating evenly dispersed 2 wt % nanocellulose (lignin-coated nanofibrils) in polypropylene.

Example 3: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (slurry) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell AClyn® 201A wax (Honeywell Performance Materials and Technologies, Morris Plains, New Jersey, USA), which is a calcium ionomer of an ethylene acrylic acid copolymer that is 47% neutralized with calcium, in powdered form.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 5, indicating evenly dispersed 2 wt % nanocellulose (lignin-coated nanofibrils) in polypropylene.

Example 4: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (slurry) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell A-C® 540A wax (Honeywell Performance Materials and Technologies, Morris Plains, New Jersey, USA), which is an ethylene acrylic acid copolymer, in powdered form. Honeywell A-C® 540A wax contains 5 wt % acrylic acid.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 6, indicating evenly dispersed 2 wt % nanocellulose (lignin-coated nanofibrils) in polypropylene.

Example 5: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (slurry) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell A-C® 580 wax (Honeywell Performance Materials and Technologies, Morris Plains, New Jersey, USA), which is an ethylene acrylic acid copolymer, in pellet form. Honeywell A-C® 580 wax contains 10 wt % acrylic acid and has an acid number of 75.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 7, indicating evenly dispersed 2 wt % nanocellulose (lignin-coated nanofibrils) in polypropylene.

Example 6: Preparation of Nanocellulose-Dispersion Concentrate and Nanocellulose-Polylactide Composite Lignin-coated nanocrystals are obtained from fractionation of lignocellulosic biomass (hardwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (slurry) with about 6 wt % solids.

A dispersion/drying agent is selected to be a copolymer of ethylene and acrylic acid, based on the lignin-coated nanocrystals and the selected matrix polymer (polylactide). The specific dispersion/drying agent is Honeywell A-C® 540A wax (Honeywell Performance Materials and Technologies, Morris Plains, New Jersey, USA), which is an ethylene acrylic acid copolymer, in powdered form. Honeywell A-C® 540A wax contains 5 wt % acrylic acid.

A starting nanocellulose-dispersion slurry is generated by combining under mechanical stirring 1,458 grams of the aqueous suspension of lignin-coated nanocrystals with 88 grams of the dispersion/drying agent described above. The starting nanocellulose-dispersion slurry initially contains about 6 wt % nanocellulose (lignin-coated nanocrystals) and about 89 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanocrystals) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polylactide, as follows. One part by weight nanocellulose-dispersion concentrate and 99 parts by weight polylactide (INGEO® PLA 4043D, NatureWorks LLC, Minnetonka, Minnesota, USA) are combined and mixed in the Brabender torque rheometer. The rheometer is operated at a speed of 40 RPM and a temperature of 140° C., for 11 minutes. The resulting nanocellulose-polymer composite is shown in the optical micrograph (100× magnification) of FIG. 8, indicating evenly dispersed 0.5 wt % nanocellulose (lignin-coated nanocrystals) in polylactide.

Example 7: Preparation of Nanocellulose-Dispersion Concentrate and Nanocellulose-Polylactide Composite Lignin-coated nanocrystals are obtained from fractionation of lignocellulosic biomass (hardwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (slurry) with about 6 wt % solids.

A dispersion/drying agent is selected to be a copolymer of ethylene and acrylic acid, based on the lignin-coated nanofibrils and the selected matrix polymer (polylactide). The specific dispersion/drying agent is Honeywell A-C® 580 wax (Honeywell Performance Materials and Technologies, Morris Plains, New Jersey, USA), which is an ethylene acrylic acid copolymer, in pellet form. Honeywell A-C® 580 wax contains 10 wt % acrylic acid and has an acid number of 75.

A starting nanocellulose-dispersion slurry is generated by combining under mechanical stirring 1,458 grams of the aqueous suspension of lignin-coated nanocrystals with 88 grams of the dispersion/drying agent described above. The starting nanocellulose-dispersion slurry initially contains about 6 wt % nanocellulose (lignin-coated nanocrystals) and about 89 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanocrystals) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polylactide, as follows. One part by weight nanocellulose-dispersion concentrate and 99 parts by weight polylactide (INGEO® PLA 4043D, NatureWorks LLC, Minnetonka, Minnesota, USA) are combined and mixed in the Brabender torque rheometer. The rheometer is operated at a speed of 40 RPM and a temperature of 140° C., for 11 minutes. The resulting nanocellulose-polymer composite is shown in the optical micrograph (100× magnification) of FIG. 9, indicating evenly dispersed 0.5 wt % nanocellulose (lignin-coated nanocrystals) in polylactide.

Example 8: Preparation of Nanocellulose-Dispersion Concentrate for Non-Aqueous Chemical Systems Lignin-coated nanocellulose fibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (slurry) with about 3 wt % solids.

A dispersion/drying agent is selected to be an ammonia stearate emulsion, an ammonium salt of stearic acid. Stearic acid is a fatty acid with an 18-carbon chain with a chemical formula of $C_{17}H_{35}CO_2H$ and is chosen for bifunctional character, with a polar head group that can react with nanocellulose and lignin hydroxyl groups and a non-polar chain that confers solubility in organic solvents.

A starting nanocellulose-dispersion slurry is generated by mixing 3889 grams of the aqueous suspension of lignin-coated nanofibrils with 58 grams of ammonia stearate dispersion/drying agent, in aqueous emulsion form. The starting nanocellulose-dispersion slurry initially contains about 3 wt % nanocellulose (lignin-coated nanofibrils) and about 96 wt % water. The starting slurry is dried with a semi-batch process under heat and shear, using a laboratory-scale twin-screw system consisting of a Brabender PL200 Plasti-Corder torque rheometer with Haake Rheomix 3000 mixer, mixing at mixing blades speed of 100 RPM and a temperature of 120° C., for 90 minutes. The slurry is added to the twin-screw system continuously as the volume in the mixer bowl decreases as water is evaporated. The process continues until all the slurry has been fed and until all the moisture has evaporated from the material, for approximately 90 minutes, at which point the dry concentrate is recovered from the twin-screw system. The processing time and amount of water required to be removed during drying can be reduced significantly by pre-concentrating the slurry through centrifugation, for example. During mixing under heat, water is allowed to evaporate from the nanocellulose slurry. As water is removed under shear mixing, the nanocellulose is prevented from agglomerating and bonding with itself and the stearic acid (or stearate) acts as a spacer between the nanocellulose particles.

Once essentially all the water is removed from the starting nanocellulose-dispersion slurry, the result is a nanocellulose-dispersion concentrate containing about 67 wt % nanocellulose (lignin-coated nanofibrils) and about 33 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground in a hammer mill and dispersed into diisononyl phthalate (DINP), a common plasticizer, as follows. Approximately two parts by weight nanocellulose-dispersion concentrate and 98 parts by weight DINP are combined at ambient conditions in a vortex mixer for 4 minutes. The resulting stable, thixotropic nanocellulose non-aqueous dispersion is shown in the optical micrograph (400× magnification) of FIG. 10, indicating evenly dispersed ~1.3 wt % nanocellulose (lignin-coated nanofibrils) in DINP.

Comparative Example A: Oven Drying Rather Than Twin-Screw System for Nanocellulose Dewatering/Drying Lignin-coated nanocellulose fibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (slurry) with about 3 wt % solids.

A dispersion/drying agent is selected to be an ammonia stearate emulsion, an ammonium salt of stearic acid. Stearic acid is a fatty acid with an 18-carbon chain with a chemical formula of $C_{17}H_{35}CO_2H$ and is chosen for bifunctional character, with a polar head group that can react with nanocellulose and lignin hydroxyl groups and a non-polar chain that confers solubility in organic solvents.

A starting nanocellulose-dispersion slurry is generated by mixing 3889 grams of the aqueous suspension of lignin-coated nanofibrils with 58 grams of ammonia stearate dispersion/drying agent, in aqueous emulsion form. The starting nanocellulose-dispersion slurry initially contains about 3 wt % nanocellulose (lignin-coated nanofibrils) and about 96 wt % water.

The starting nanocellulose-dispersion slurry is oven-dried to vaporize water from the slurry. Once essentially all the water is removed, the result is a nanocellulose-dispersion concentrate containing about 67 wt % nanocellulose (lignin-coated nanofibrils) and about 33 wt % dispersion/drying agent.

The nanocellulose-dispersion concentrate obtained is then ground in a hammer mill and dispersed into diisononyl phthalate (DINP), a common plasticizer, as follows. Approximately two parts by weight nanocellulose-dispersion concentrate and 98 parts by weight DINP are combined at ambient conditions in a vortex mixer for 4 minutes. The resulting nanocellulose non-aqueous dispersion is shown in the optical micrograph (400× magnification) of FIG. 11, indicating large agglomerates that are not dispersed in DINP. This poor result is in contrast to the good dispersion observed in FIG. 10 from Example 8, which utilizes a twin-screw system for drying, rather than a thermal oven.

Comparative Example B: High-Intensity Mixing Rather Than Twin-Screw System for Nanocellulose Dewatering/Drying Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (starting slurry) with about 6 wt % solids.

A dispersion/drying agent is selected to be a copolymer of ethylene and acrylic acid, based on the lignin-coated nanocrystals and the selected matrix polymer (polylactide). The specific dispersion/drying agent is Honeywell A-C® 540A wax (Honeywell Performance Materials and Technologies, Morris Plains, New Jersey, USA), which is an ethylene acrylic acid copolymer, in powdered form. Honeywell A-C® 540A wax contains 5 wt % acrylic acid.

The starting slurry is dried with a semi-batch process under heat and shear, using a FM10L Henschel® mixer, operated at 3800 RPM with a heated jacket and vent for vapor release. The dispersion/drying agent melts and coats the sides of the heated vessel and does not mix with the nanocellulose. There is vigorous steam generation. During drying, it is observed that the dispersion/drying agent segregates to the sides because of incompatibility with the water. This poor result is in contrast to Example 1, which utilizes a twin-screw extruder for drying, rather than a high-intensity mixer without screws. In a twin-screw extruder, the wax phase and water are forced together and cannot escape one another except via vapor-phase escape of water through the vent.

Comparative Example C: Oven Drying Without a Dispersion/Drying Agent for Nanocellulose Dewatering/Drying Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (starting slurry) with about 6 wt % solids.

Figure 12:
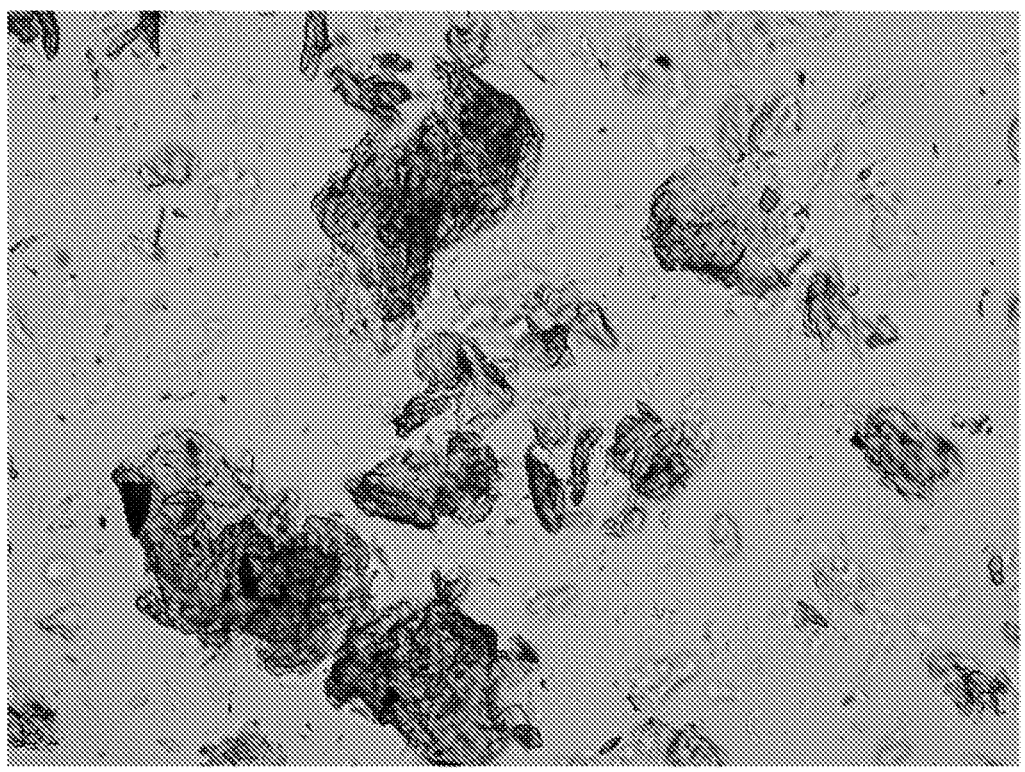
FIG. 12 is an exemplary optical micrograph (100× magnification) showing poor nanocellulose dispersion (significant particle agglomeration) of 2 wt % nanocellulose (lignin-coated nanofibrils) in diisononyl phthalate in which the nanocellulose had been dried without a dispersion/drying agent and with oven drying rather than with a twin-screw system.
Figure 13:
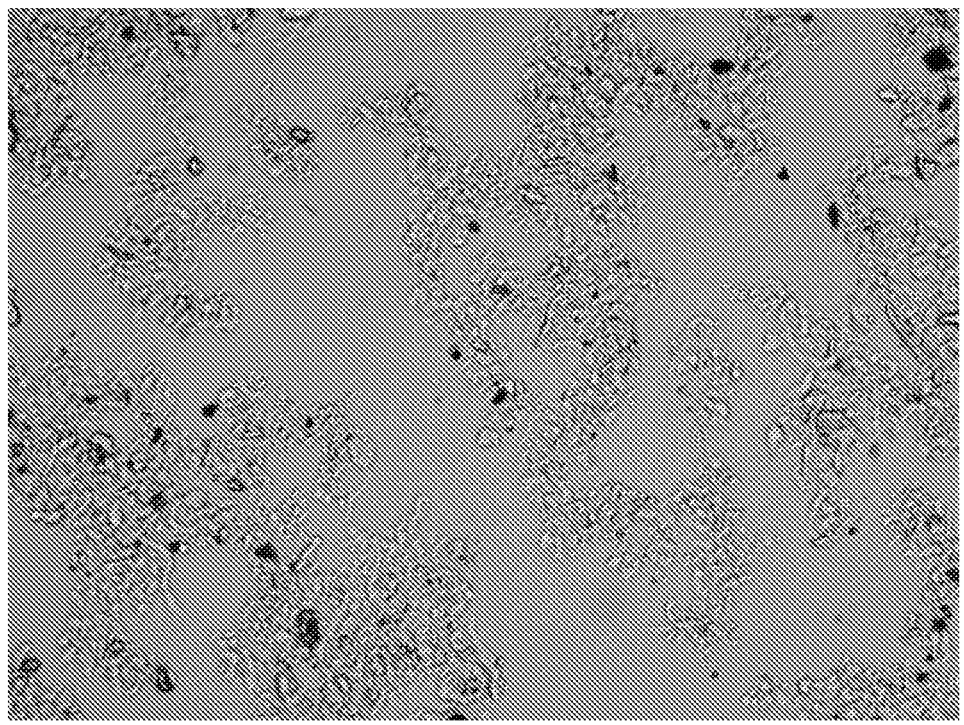
FIG. 13 is an optical micrograph (100× magnification) of as-produced, never-dried, never-concentrated 2 wt % lignin-coated nanofibrils dispersed in water.
Figure 14:
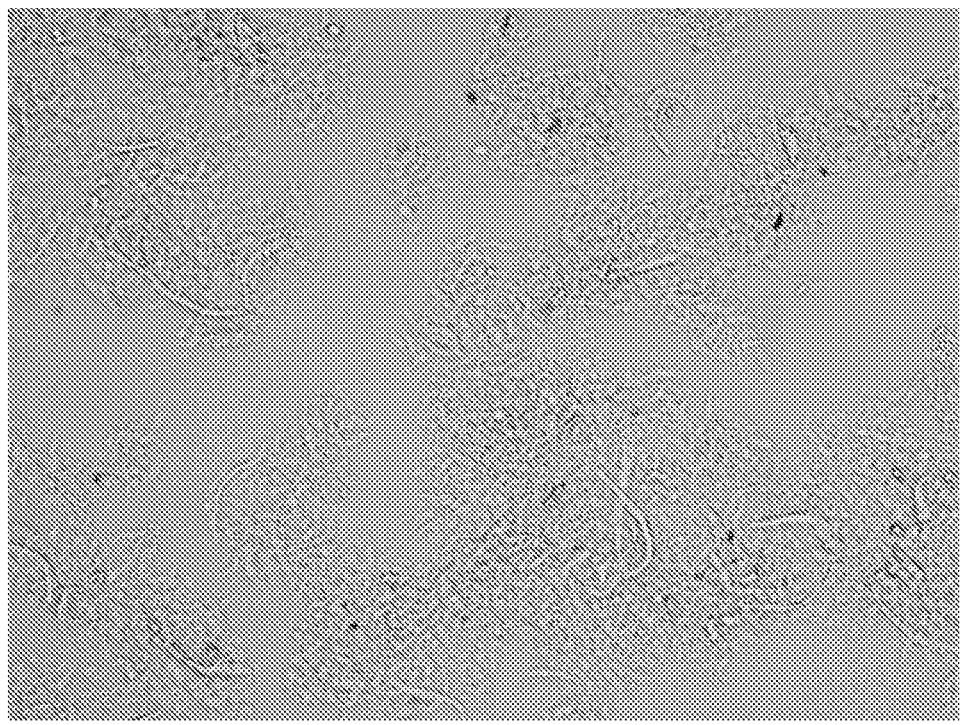
FIG. 14 is an optical micrograph (100× magnification) of as-produced, never-dried, never-concentrated 2 wt % lignin-coated nanocrystals dispersed in water.

The starting nanocellulose-dispersion slurry is oven-dried to vaporize water from the slurry. FIG. 12 is an exemplary optical micrograph (100× magnification) showing poor nanocellulose dispersion (significant particle agglomeration) of 2 wt % nanocellulose (lignin-coated nanofibrils) in diisononyl phthalate in which the nanocellulose had been dried without a dispersion/drying agent and with oven drying rather than with a twin-screw system.

Example 9: Nanocellulose Dewatering Using a Pilot-Scale Twin-Screw Extruder

Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (starting slurry) with about 6.3 wt % nanocellulose solids.

A pilot-scale twin-screw extruder is designed with co-rotating screws that each have 36 mm outside diameter (D) and 1.44 m screw length (L=40D). A feed tank to the twin-screw extruder is configured with an internal wiping blade for controlled feed of the nanocellulose slurry into the screws. The twin-screw extruder has eight heating zones (barrels), with one extruder vent in the seventh barrel, close to the extruder outlet die. The extruder vent is operated at a pressure of 1 bar, rather than under vacuum, so that steam release may be observed. Each heating zone barrel is configured with an electrical heater as well as a jacket inlet and jacket outlet for a heat-transfer medium (e.g., steam, oil, or cooling water). In this example, the electrical heaters are used to reach set-point temperatures for each zone; no steam or cooling water are used.

The nanocellulose slurry is fed to the twin-screw extruder at a feed rate of 10 lb/hr (about 4.5 kg/hr). The twin-screw extruder screw speed is 330 RPM. The material passes through the twin-screw extruder one time, with an estimated residence time that is less than 1 minute. Steam release is observed.

Two temperature profiles are tested in this Example 9, labeled profiles 9(a) and 9(b) in Table 1 below. In Table 1, $T_x$ is the measured temperature for zone x (x=1 to 8) as recorded from the control panel.

TABLE 1

Temperature profiles in the twin-screw extruder barrel zones for Example 9.

| Temp. Profile | $T_1$ | $T_2$ | $T_3$ | $T_4$ | $T_5$ | $T_6$ | $T_7$ | $T_8$ | Solids, wt % |
|---|---|---|---|---|---|---|---|---|---|
| 9(a) | 82° C. | 76° C. | 106° C. | 113° C. | 145° C. | 146° C. | 151° C. | 126° C. | 23 |
| 9(b) | 80° C. | 80° C. | 120° C. | 118° C. | 158° C. | 171° C. | 174° C. | 195° C. | 61 |

As observed from Table 1, the temperature profile 9(a) results in a dewatered nanocellulose material that is 23 wt % nanocellulose, which is a wet powder. The average temperature for profile 9(a) is about 118° C. The temperature profile 9(b) results in a dewatered nanocellulose material that is 61 wt % nanocellulose, which is a free-flowing powder. The average temperature for profile 9(b) is about 137° C. It is expected that even higher extents of dewatering may be realized if the extruder vent is operated under vacuum.

Example 10: Nanocellulose Dewatering Using a Pilot-Scale Twin-Screw Extruder Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (starting slurry) with about 8.9 wt % nanocellulose solids.

A pilot-scale twin-screw extruder is designed with co-rotating screws that each have 36 mm outside diameter (D) and 1.44 m screw length (L=40D). A feed tank to the twin-screw extruder is configured with an internal wiping blade for controlled feed of the nanocellulose slurry into the screws. The twin-screw extruder has eight heating zones (barrels), with one extruder vent in the seventh barrel, close to the extruder outlet die. The extruder vent is operated at a pressure of 1 bar, rather than under vacuum, so that steam release may be observed. Each heating zone barrel is configured with an electrical heater as well as a jacket inlet and jacket outlet for a heat-transfer medium (e.g., steam, oil, or cooling water). In this example, the electrical heaters are used to reach set-point temperatures for each zone; no steam or cooling water are used.

The nanocellulose slurry is fed to the twin-screw extruder at a feed rate of 10 lb/hr (about 4.5 kg/hr) for a 20-minute trial. The twin-screw extruder screw speed is 300 RPM. The material passes through the twin-screw extruder one time, with an estimated residence time that is less than 1 minute. Steam release is observed.

Two temperature profiles are tested in this Example 10, labeled profiles 10(a) and 10(b) in Table 2 below. In Table 2, $T_x$ is the measured temperature for zone x (x=1 to 8) as recorded from the control panel.

Example 11: Nanocellulose Dewatering Using a Commercial-Scale Twin-Screw Extruder Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (starting slurry) with about 7.6 wt % nanocellulose solids.

A twin-screw extruder is designed with co-rotating screws that each have 65 mm outside diameter (D) and 4.5 m screw length (L=69D). Nanocellulose is poured directly into the throat of the twin-screw extruder from a bucket. The twin-screw extruder has eight heating zones (barrels), with one extruder vent in the seventh barrel, close to the extruder outlet die. The extruder vent is operated at a pressure of 1 bar, rather than under vacuum, so that steam release may be observed. Each heating zone barrel is configured with an electrical heater as well as a jacket inlet and jacket outlet for a heat-transfer medium (e.g., steam, oil, or cooling water). In this example, the electrical heaters are used for each zone; no steam or cooling water are used.

The nanocellulose slurry is fed to the twin-screw extruder operated with a screw speed of about 300 RPM. The material is passed through the twin-screw extruder six times by recovering the material from one pass and feeding that material again through the twin-screw extruder. It is observed that each pass produces a material that is drier than the last pass. Steam release is observed during each pass.

Table 3 below shows the measured temperatures for each zone during the last pass. In Table 3, $T_x$ is the measured temperature for zone x (x=1 to 8) as recorded from the control panel. The average measured temperature is about 132° C.

TABLE 2

Temperature profiles measured in the twin-screw extruder barrel zones for Example 10.

| Temp. Profile | $T_1$ | $T_2$ | $T_3$ | $T_4$ | $T_5$ | $T_6$ | $T_7$ | $T_8$ | Solids, wt % |
|---|---|---|---|---|---|---|---|---|---|
| 10(a) | 80° C. | 91° C. | 113° C. | 108° C. | 126° C. | 138° C. | 141° C. | 186° C. | 31.4 |
| 10(b) | 93° C. | 95° C. | 120° C. | 119° C. | 154° C. | 160° C. | 162° C. | 184° C. | 36.1 |

As observed from Table 2, the temperature profile 10(a) results in a dewatered nanocellulose material that is 31.4 wt % nanocellulose, which is a moist powder. The average temperature for profile 10(a) is about 123° C. The temperature profile 10(b) results in a dewatered nanocellulose material that is 36.1 wt % nanocellulose, which is a moist powder. The average temperature for profile 10(b) is about 136° C.

TABLE 3

Temperature profiles as measured, compared to set points, in the twin-screw extruder barrel zones for Example 12.

| Temp. Profile | $T_1$ | $T_2$ | $T_3$ | $T_4$ | $T_5$ | $T_6$ | $T_7$ | $T_8$ | Solids, wt % |
|---|---|---|---|---|---|---|---|---|---|
| Measured | 100 | 100 | 115 | 138 | 127 | 138 | 140 | 195 | 96 |

As observed from Table 3, this experiment results in a dewatered nanocellulose material that is 96 wt % nanocellulose, which is a free-flowing dry powder.

It is expected that this extent of dewatering may be realized with fewer passes if the extruder vent is operated under vacuum and/or if the twin-screw extruder is operated at higher zone temperatures. Also, pre-concentrating the starting slurry, such as via centrifugation, to about 15-25 wt % solids (for example) will reduce the amount of water to be removed from the twin-screw extruder and reduce the number of passes needed to achieve a desired extent of dewatering.

These Examples 9 to 11 demonstrate that twin-screw extruder dewatering of nanocellulose is unexpectedly effective, robust, and readily tunable for a wide range of moisture contents in the extruder product stream. The intimate mixing provided by the twin screws leads to particle tumbling and grinding so that particle drying is relatively uniform. It is shown in these trials that a twin-screw extruder can be configured to produce a fine-grained powder of nanocellulose that is over 95 wt % solids. A fine-grained powder product is easy to handle and convey, avoiding challenges with handling of viscoelastic nanocellulose materials that have significant water content.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A method to dewater a nanocellulose slurry, said method comprising the following steps in sequence:
    (a) providing a nanocellulose slurry comprising nanocellulose and water;
    (b) providing a dispersion/drying agent that is selected for compatibility with said nanocellulose;
    (c) in a twin-screw system, intimately mixing said nanocellulose slurry and said dispersion/drying agent;
    (d) in said twin-screw system, removing at least a portion of said water from said nanocellulose slurry via one or more system vents, to generate a nanocellulose-dispersion concentrate;
    (e) optionally milling said nanocellulose-dispersion concentrate to generate a powder; and
    (f) recovering said nanocellulose-dispersion concentrate in solid form or liquid form,
    wherein said nanocellulose slurry is pre-concentrated in a nanocellulose slurry pre-concentration step to remove at least a portion of said water from said nanocellulose slurry, prior to step (c),
    wherein said dispersion/drying agent is added to said nanocellulose slurry prior to step (c),
    wherein said nanocellulose is present at a concentration of about 10 wt % to about 90 wt % in said nanocellulose-dispersion concentrate, and
    wherein said dispersion/drying agent is present at a concentration of about 5 wt % to about 65 wt % in said nanocellulose-dispersion concentrate.

2. The method of claim 1, wherein said nanocellulose slurry pre-concentration step is centrifugation.

3. The method of claim 1, wherein said nanocellulose slurry pre-concentration step is filtration.

4. The method of claim 1, wherein said dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof.

5. The method of claim 1, wherein said twin-screw system is operated with an average temperature from about 120° C. to about 300° C.

6. The method of claim 1, wherein said twin-screw system is operated with a maximum system temperature that is less than the thermal-decomposition onset temperature of said nanocellulose.

7. The method of claim 1, wherein said twin-screw system is operated with a maximum system temperature that is less than the thermal-decomposition onset temperature of said dispersion/drying agent.

8. The method of claim 1, wherein said twin-screw system is a twin-screw extruder containing a plurality of extruder zones, and wherein zone temperatures for each of said extruder zones are independently controlled.

9. The method of claim 8, wherein said zone temperatures increase along the length of said twin-screw extruder.

10. The method of claim 1, wherein at least one of said system vents is operated under vacuum.

11. The method of claim 10, wherein step (d) utilizes multiple system vents, and wherein each of said system vents is operated under vacuum.

12. The method of claim 1, wherein said nanocellulose includes cellulose nanocrystals, cellulose nanofibrils, microfibrillated cellulose, or a combination thereof.

13. The method of claim 1, wherein said nanocellulose includes lignin-containing nanocellulose.

14. The method of claim 1, wherein said nanocellulose includes lignin-coated nanocellulose.

15. The method of claim 1, wherein said method is continuous or semi-continuous.

16. The method of claim 1, wherein said method is a batch process.

* * * * *